(12) United States Patent
Feeney et al.

(10) Patent No.: US 8,231,470 B2
(45) Date of Patent: Jul. 31, 2012

(54) NETWORK-BASED CONTESTS HAVING MULTIPLE PARTICIPATING SPONSORS

(75) Inventors: Robert J. Feeney, Glendale, CA (US); Jeff E. Haas, Glendale, CA (US); Brent Wayne Barkley, Glendale, CA (US)

(73) Assignee: Vergence Entertainment LLC, Glendale, CA (US)

( * ) Notice: Subject to any disclaimer, the term of this patent is extended or adjusted under 35 U.S.C. 154(b) by 299 days.

(21) Appl. No.: 12/580,378

(22) Filed: Oct. 16, 2009

(65) Prior Publication Data
US 2010/0099471 A1   Apr. 22, 2010

Related U.S. Application Data

(60) Provisional application No. 61/106,336, filed on Oct. 17, 2008.

(51) Int. Cl.
*A63F 13/00* (2006.01)
(52) U.S. Cl. ............... 463/42; 463/25; 463/26; 463/27
(58) Field of Classification Search ............. 463/25, 463/26, 27, 42
See application file for complete search history.

(56) References Cited

U.S. PATENT DOCUMENTS

| | | | |
|---|---|---|---|
| 6,676,521 B1 | 1/2004 | La Mura et al. | |
| 2002/0107972 A1* | 8/2002 | Keane | 709/231 |
| 2002/0119824 A1* | 8/2002 | Allen | 463/42 |
| 2003/0212597 A1* | 11/2003 | Ollins | 705/14 |
| 2004/0009728 A1 | 1/2004 | Kubomura et al. | |
| 2007/0019110 A1 | 1/2007 | Cho | |
| 2007/0077981 A1 | 4/2007 | Hungate et al. | |
| 2007/0082738 A1 | 4/2007 | Fickie et al. | |
| 2007/0105613 A1* | 5/2007 | Adams et al. | 463/16 |
| 2007/0129148 A1 | 6/2007 | Van Luchene | |
| 2008/0026845 A1 | 1/2008 | Aguilar et al. | |
| 2008/0059304 A1 | 3/2008 | Kimsey | |
| 2008/0076530 A1 | 3/2008 | Kulas | |
| 2008/0113815 A1* | 5/2008 | Weingardt | 463/42 |
| 2009/0124384 A1 | 5/2009 | Smith et al. | |
| 2009/0254417 A1* | 10/2009 | Beilby et al. | 705/10 |

FOREIGN PATENT DOCUMENTS

| | | |
|---|---|---|
| KR | 10-2006-000179 | 1/2006 |
| WO | WO/0170359 | 9/2001 |

OTHER PUBLICATIONS

International Search Report and Written Opinion in corresponding PCT Application No. PCT/US2009/060948.

* cited by examiner

*Primary Examiner* — James S McClellan
(74) *Attorney, Agent, or Firm* — Joseph G. Swan, P.C.

(57) ABSTRACT

Provided are, among other things, systems, methods and techniques for conducting a contest. One embodiment provides a contest that is played by multiple players across a communications network, in which the players compete to earn points awarded by a central contest administrator and the individual players are ranked based on their total number of points. In addition, individual ones of the players are allowed to select a sponsor from a set of previously identified sponsors, and the players also can earn points, which contribute to their totals for ranking purposes, from the sponsors they have selected. For this purpose, individual ones of the sponsors in the set are allocated points and have flexibility regarding how to award their allocated points to the players that have selected them.

14 Claims, 7 Drawing Sheets

NETWORK-BASED CONTESTS HAVING MULTIPLE PARTICIPATING SPONSORS

This application claims the benefit of U.S. Provisional Patent Application Ser. No. 61/106,336, filed on Oct. 17, 2008, and titled "Contest Platforms and Features", which application is incorporated by reference herein as though set forth herein in full.

FIELD OF THE INVENTION

The present invention pertains to networked-based contests, such as trivia contests conducted over the Internet, and is particularly applicable to contests in which multiple sponsors participate.

BACKGROUND

A variety of different electronic and online games currently exist. In order to provide or supplement revenue from such games, some have incorporated paid, in-game advertising, in which advertisers pay to have their products and/or logos featured in the game. For example, in some conventional console and computer video games, players can pick a team, a product or sponsorships from well-known brands. Examples include: racing games such as Gran Turismo™ and Forza™; sports games such as Madden NFL™ and FIFA™; and skateboarding games such as Skate 2™ and the Tony Hawk™ series. In addition, several conventional casual game sites feature popular companies/brands sponsoring prizes or appearing in commercials and banner ads. These sites include GSN.com, Pogo.com, AddictingGames.com and Games.Yahoo.com.

SUMMARY OF THE INVENTION

The present invention provides, among other things, network-based (e.g., Internet-based) contest structures in which multiple different sponsors play a more active role in a game or contest. In fact, in certain embodiments, not only are the players competing against each other, but the sponsors also are able to engage in some form of competition among themselves, such as competing to be selected by the greatest number of players and/or competing to have the most successful "sponsorship team". At the same time, the preferred embodiments of the present invention provide the opportunity for sponsors to create a kind of virtual community among those players who have selected them, thereby enhancing the overall contest experience for the players while at the same time providing the sponsors with a unique ability to communicate with individuals who might be customers or potential customers of the sponsors.

Thus, one specific embodiment of the invention is directed to conducting a contest. A contest that is played by multiple players across a communications network is provided. The players compete to earn points awarded by a central contest administrator and the individual players are ranked based on their total number of points. In addition, individual ones of the players are allowed to select a sponsor from a set of previously identified sponsors, and the players also can earn points, which contribute to their totals for ranking purposes, from the sponsors they have selected. For this purpose, individual ones of the sponsors in the set are allocated points and have flexibility regarding how to award their allocated points to the players that have selected them.

Another embodiment is directed to systems, methods, techniques and devices for interfacing with a server that is hosting a contest, by communicating over a communications network with a server hosting a remotely hosted contest and generating a user interface that displays information pertaining to the contest. The user interface: (a) displays current contest-performance information for a player, (b) enables the player to navigate through a set of profile cards for other players in the contest, selecting individual profile cards to be displayed, as desired, such profile cards including identification information and current contest-performance information for the respective players, and (c) displays information about sponsors selected by the player.

A still further embodiment is directed to systems, methods, techniques and devices for interfacing with a server hosting a contest, by communicating over a communications network with a server hosting a remotely hosted contest and generating a user interface that displays information pertaining to the contest. The user interface: (a) enables the player to navigate through a set of profile cards for other players in the contest, selecting individual profile cards to be displayed, as desired, and to communicate with the other players in the contest using links provided in corresponding ones of the profile cards, and (b) allows the player to access other information pertaining to the contest. According to this embodiment, the foregoing process steps are part of a dedicated game interface program, and the foregoing communicating step obtains information for the profile cards and the other information pertaining to the contest from the server.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

This application is related to commonly assigned U.S. patent application Ser. No. 11/539,179, filed Oct. 6, 2006 (the '179 Application) and U.S. patent application Ser. No. 11/539,180, filed Oct. 6, 2006 (the '180 Application). The '179 Application and the '180 Application claim the benefit of U.S. Provisional Patent Application Ser. No. 60/724,473, filed on Oct. 6, 2005. The foregoing applications are incorporated by reference herein as though set forth herein in full.

The present disclosure concerns a variety of different contest platforms, components and features that can be used in conjunction with contests played over a network (e.g., online contests played over the Internet). These various platforms, components and features can be used in implementing a question-and-answer or problem-based contest with the questions or problems being delivered substantially simultaneously to multiple geographically dispersed players, e.g., as described in the '179 Application. Alternatively, such systems, methods and techniques can be used in conjunction with any other kind of question-and-answer or problem-based contest, any kind of skill-based contest (e.g., a fight or battle contest, a competition involving ability to drive or navigate, a virtual card game or a virtual dice game), a virtual or real-world scavenger hunt, or any other kind of game or contest, e.g., based on knowledge, skill, luck or any combination of these factors. Generally speaking, the preferred embodiments concern a primarily question-and-answer and/or problem-based hosted contest that is conducted over a significant period of time (e.g., at least 2-3 days, a week, 2-3 weeks, a month or even longer), with points awarded for answering or solving the individual questions or problems correctly, in which the individual players are ranked based on the total number of points they earned in the contest.

As used herein, the term "contest" refers to any kind of game in which the players compete against one another to achieve the highest ranking(s). Although the embodiments discussed herein primarily refer to contests, it should be noted that the same features and structures generally also can be used in conjunction with the provision of other kinds of games that do not involve a contest element.

Contest Systems

Figure 1:
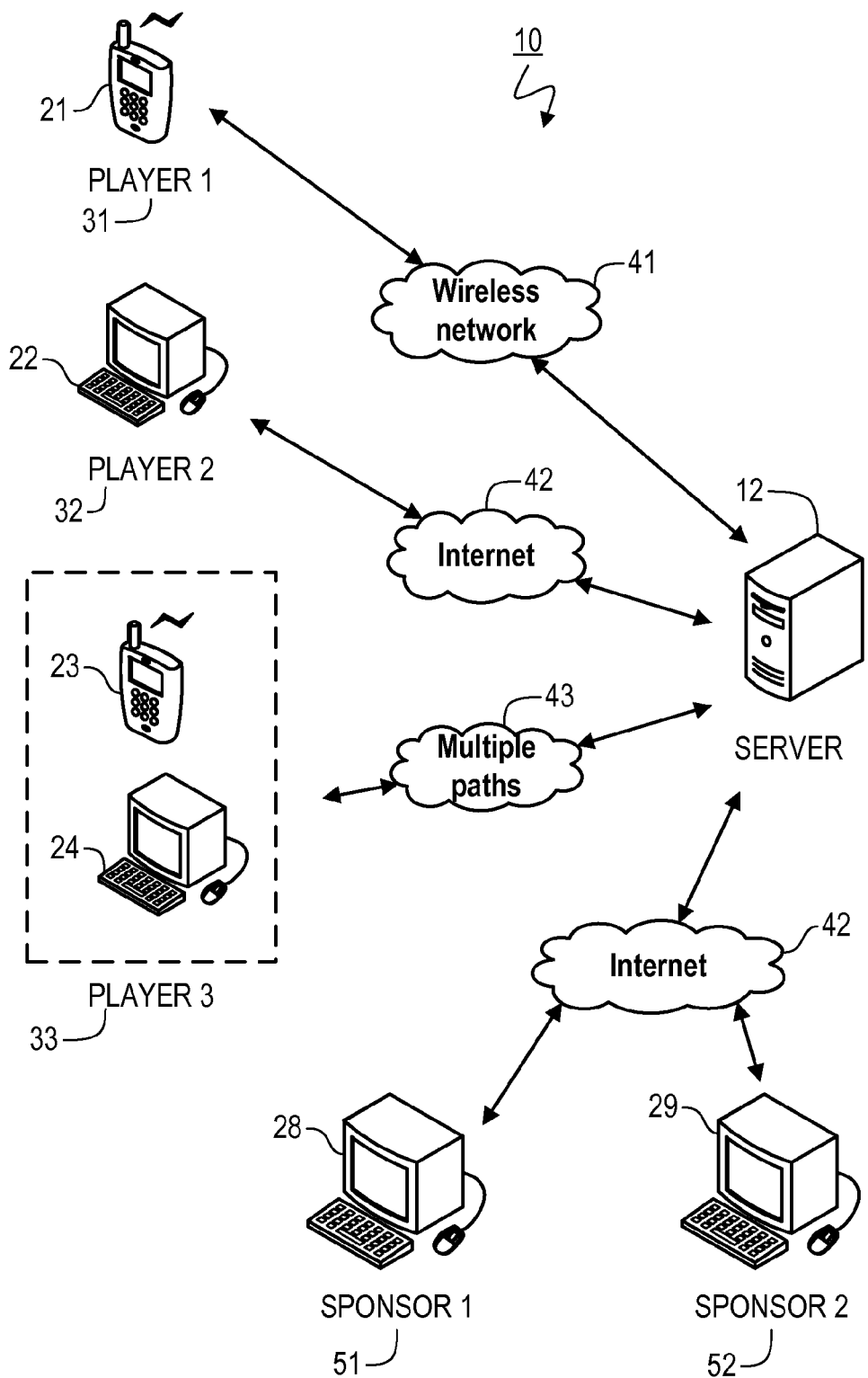
FIG. 1 illustrates an overview of a system for conducting contests according to a representative embodiment of the present invention.

Many of the techniques of the present invention contemplate participation in a contest (or other kind of game) by a large number of geographically dispersed individuals or devices (e.g., spread across different cities, states or even countries). FIG. 1 illustrates an overview of a system 10 for achieving this goal, according to a representative embodiment of the present invention.

Generally speaking, a central server 12 manages and runs the contest in real time, communicating with a plurality of different player devices (e.g., devices 21-24). Each such player device 21-24 typically has a player associated with it (e.g., player 31 for device 21 and player 32 for device 22). In some cases, a single player (e.g., player 33) has two or more player devices (e.g., devices 23 and 24) that can be used to communicate with server 12 and, therefore, through which the player can participate in the contest.

Server 12 can be implemented as a single physical device, but more commonly will be implemented as a server cluster, with redundancy, appropriate load-balancing hardware and software, and different functionality distributed across different physical boxes, as is well known in the art. In one embodiment, different physical devices are used for communicating across different kinds of networks (e.g., directly over the Internet, by SMS messaging, or using a proprietary network or wireless protocol).

It is noted that although only six player devices 21-24 are illustrated in FIG. 1, this is for ease of illustration only. Typically, there will be many more player devices that are used to participate in the contest, such as more than 50, 100, 500, 1,000 or even 10,000 such devices (as well as a similar number of players). Also, the same server 12 can be used to handle multiple different contests, e.g., using different player/contest-information databases and different back-end processing routines for such different contests.

Each of the players 31-33 preferably will have pre-registered with server 12 for the contest, and may also have designated the device(s) which such player 31-33 will be using to participate in the contest. In the preferred embodiments, the players 31-33 will have installed a contest interface application on the devices 21-24 that they will be using, an example of such an interface application being described in greater detail below.

As shown in FIG. 1, server 12 may communicate with the various player devices 21-24 using a wireless network 41, using direct Internet communications 42, using multiple different communication paths 43 for a single device (e.g., Internet connection to a wireless network) or for the different devices 23 and 24 (e.g., a wireless network for device 23 and a direct Internet connection for device 24). The specific protocols used to convey information between the server 12 and the devices 21-24 typically are not critical, but instead will be selected based on the kinds of data intended to be transferred and the communication path used. In particular, any of a variety of different protocols can be used, such as hypertext transfer protocol (HTTP), file transfer protocol (FTP), any proprietary data-transfer protocol, or even instant messaging or e-mail messaging protocols.

The specific ways described above for server 12 to communicate with the various player devices 21-24 should be understood as being exemplary only. Any other communication modes or paths instead, or in addition, may be used. Also, any combination of different paths or modes may be used.

FIG. 1 illustrates two-way communication between the server 12 and the various player devices 21-24. However, in certain preferred embodiments of the invention, communication is unidirectional between server 12 and player devices 21-24.

In addition to various contest players 31-33 communicating with server 12, in the preferred embodiments multiple different sponsors (e.g., sponsors 51 and 52) also communicate with server 12 through their own devices 28 and 29, respectively (typically, general-purpose computers). Although it is possible to create and provide a special user-interface program for the sponsors to use in communicating with server 12, in most cases such communications preferably are accomplished using a simple Web interface. Also, although sponsors 51 and 52 are shown in FIG. 1 as only communicating with server 12, in many embodiments some or all of the sponsors 51 and 52 also communicate directly with the contest players 31-33 (e.g., through their own Websites or otherwise outside of system 10). Finally, while only two sponsors 51 and 52 are shown in FIG. 1 (for ease of illustration), ordinarily there will be a greater number of sponsors involved, such as at least 5, 10, 15, 20 or even more sponsors.

Figure 2:
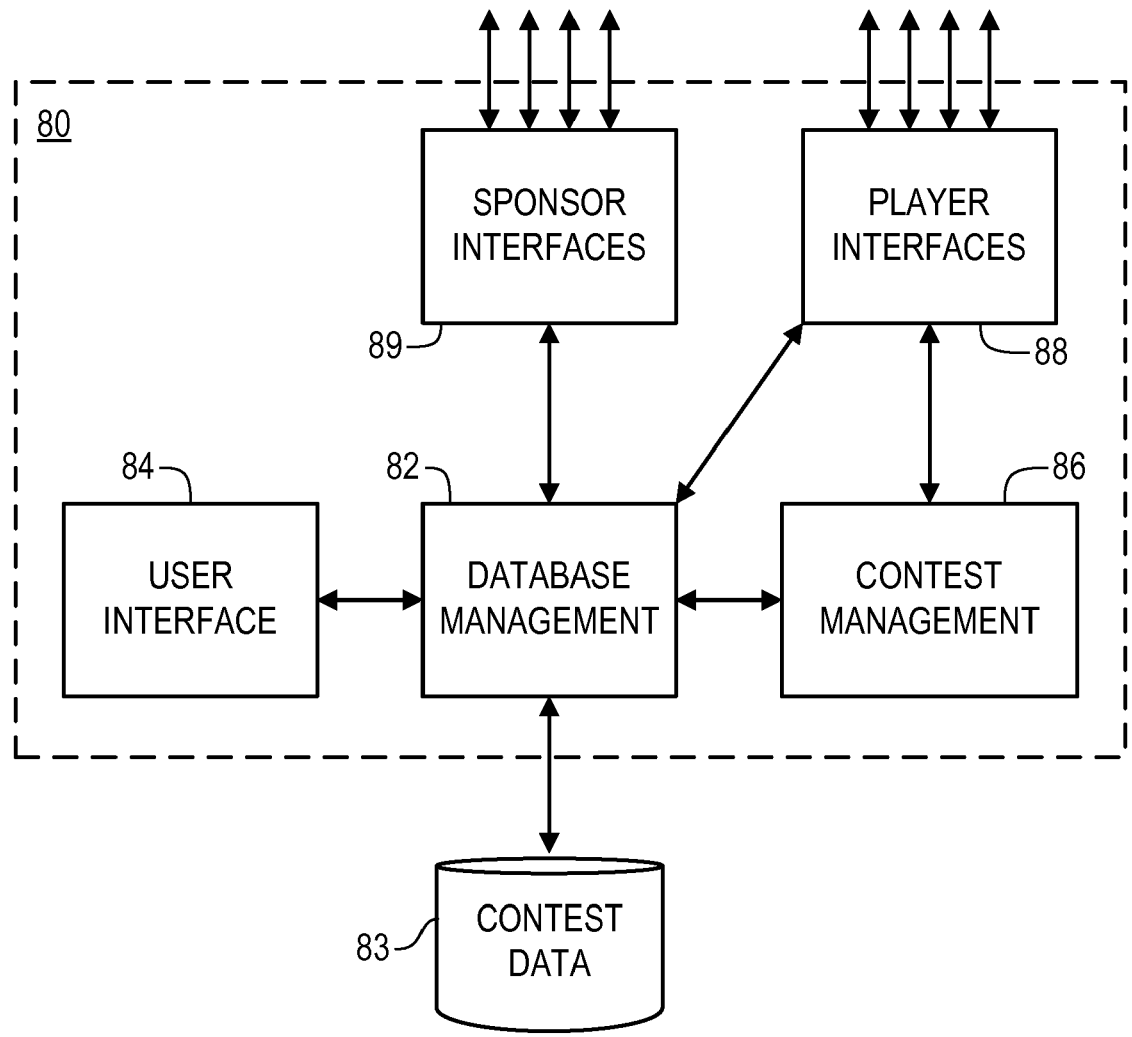
FIG. 2 is a block diagram showing a contest administration system according to a representative embodiment of the present invention.

FIG. 2 is a block diagram showing a contest administration system 80 implemented by server 12 according to a representative embodiment of the present invention. Ordinarily, system 80 will be implemented by one or more general-purpose processors within server 12, executing computer software, firmware or other computer-executable process steps, with the individual components of system 80 typically being written as software modules.

One of the primary components of system 80 is database management component 82 which manages all of the player, sponsor and other information in connection with the contest.

Such information preferably is stored in one or more data storage devices 83 (typically magnetic and/or optical drives). In the preferred embodiments, database management component 82 communicates with: a user interface component 84, a contest management component 86, player interfaces 88; and sponsor interfaces 89.

The user interface component 84 enables individuals associated with the contest administrator to provide contest questions and answers and to generally manage the hosted contest(s). For example, such individuals preferably have the ability to modify rules regarding when questions are delivered to the players, to set the point value for each individual question, and/or to modify the parameters of the contest(s). All such configuration and content information preferably is stored into database 83 through database management component 82.

In the preferred embodiments, the contest management component 86 manages the real-time delivery of questions, the evaluation of responses, the awarding of contest points (usually referred to as Dallions™ in the current embodiments), any redemption of such points for prizes for other articles, and the delivery of other aspects of the overall contest environment. In essence, it preferably functions as the principal engine for the contest.

The player interfaces 88 handles the details of the actual delivery of questions and/or problems to, and then receipt of responses from, the players. In addition, the player interfaces 88 preferably: receive player profile information for storage by database management component 82; retrieve from database management component 82 and then display to the respective players various player-specific contest-environment information and features and other information requested to be displayed by such players; and manage messaging between individual players. All profile and other information pertaining to the individual player preferably is stored into database 83 through database management component 82.

The sponsor interfaces 89 preferably manage communications with the contest's sponsors. Such functionality can include, e.g., initial registration of a sponsor, purchases of Dallions by a sponsor, establishment and management of contests and virtual spaces by a sponsor, communications to a sponsor from the players, and Communications from the sponsor to players each. All information pertaining to the individual sponsor preferably is stored into database 83 through database management component 82.

Contests Having Multiple Participating Sponsors

The preferred embodiments of the present invention incorporate new gaming structures and methods in which different sponsors have a more active role in the gaming environment. For example, in certain embodiments, not only are the players allowed to select one or more sponsors, but upon doing so the players have interactions with the selected sponsor(s), where the individual sponsors have an ability to define particular kinds of interactions that are only open to the players that have selected them. As discussed in more detail below, examples of the general kinds of such interactions can include side contests, chat rooms, virtual resource rooms and the like.

More specifically, in the preferred embodiments of the present invention, players are permitted to select one or more sponsors from a group or set of sponsors made available by the administrators of the contest. Preferably, such selections can be performed through a graphical user interface, e.g., by simply dragging one or more desired sponsor icons, from a page of available sponsors, into available sponsor "badges". The ability to choose sponsors in this manner often can open up a range of additional contest features, as well as providing a unique opportunity for the sponsors to communicate with the individual players or contestants.

Figure 3:
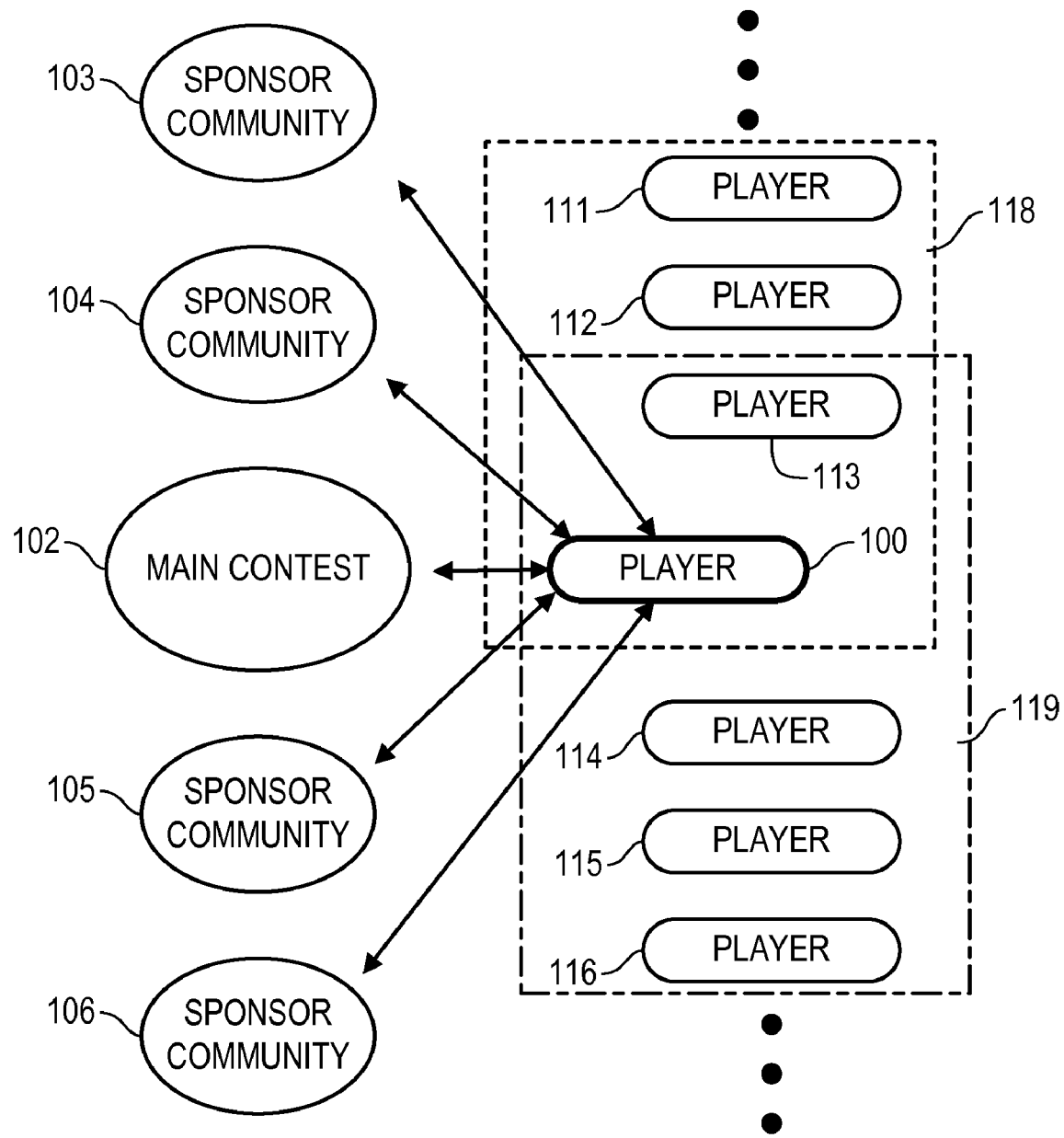
FIG. 3 is a block diagram illustrating examples of the relationships and interactions that a contest player can have within a representative embodiment of the present invention.

FIG. 3 is a block diagram illustrating some of the relationships and interactions that any given contest player 100 can have within a representative embodiment of the present invention. Often, the main interactions a player 100 has will be with the main contest 102, i.e., the contest 102 that is provided by the contest administrators.

In addition, in the preferred embodiments the player 100 often will interact within a number of different sponsor communities 103-106, e.g., communities centered around, or provided by or under the direction of, the sponsor(s) that the player 100 has selected, from a set of participating sponsors. In the present example, the player 100 has selected four sponsors (the maximum number each player is able to select in the current embodiment) and thus is able to interact in the corresponding four communities 103-106.

Preferably, the nature of each such community is largely within the discretion of the corresponding sponsor. More preferably, each sponsor will have been allocated a specified number of points or Dallions for distribution to the players that have selected it, and the Dallions allocated to the sponsors have the same effect as the Dallions awarded by the main contest 102, e.g., so that they are counted in determining the individual players' ranks in the main contest 102. More preferably, the individual sponsors have significant flexibility in determining how to distribute or award the Dallions that have been allocated to them to the players that have selected them.

However, in order to distribute their allocated Dallions, the individual sponsors often will create side contests in which the players that have selected them (typically, and only such players) may participate. Preferably, the structure (e.g., rules) and content (e.g., questions) for each such side contest is largely within the discretion of the individual sponsors, although the administrators of the overall contest 102 may also provide and enforce guidelines pertaining to such contests.

In the current embodiments, it is assumed that most aspects of the contests, including interactions with the various sponsors, are conducted through the contest administration system 80. For example, the contest administrators may provide contest templates which can then be customized by the individual sponsors (e.g., by specifying when questions or problems are to be delivered, how much time a player has to respond, how many points are awarded for correct answers, whether and how such awarding of points is tied to speed of response, and the like) and then populated with content (e.g., questions and/or problems) to create a specific contest. Such an approach allows the contest administrators to have some control over the contests, as well as to be able to screen content to ensure that it is appropriate and/or otherwise complies with the contest's standards.

However, it should be noted that such side contests and/or any other communications with the individual sponsors may occur directly, i.e., outside of system 80. In such cases, once a sponsor has been selected, the system 80 simply could provide a link to a particular portion of the sponsor's website. If, for example, a sponsor directly conducts a contest in such a manner, the only subsequent communication that often will be desirable is for the sponsor to provide the contest system 80 (e.g., through a sponsor interface 89) with information regarding how its allocated Dallions have been awarded to the individual players (which information preferably is then used by database management component 82 to credit the accounts of such players).

In addition to contests, the individual sponsors preferably have the ability to communicate with the players that have selected them and/or to facilitate such players communicating among themselves. For example, in certain embodiments the contest administration system 80 provides a messaging system in which a distribution list (containing all the players who have selected the sponsor) is maintained for each sponsor, allowing the sponsors to directly communicate with the players who have selected them. In certain embodiments, the contest administrators only permit commercial messages to be directly transmitted to the individual players through these channels, although sponsors (and potentially non-sponsor advertisers) preferably have the ability to purchase, and therefore have displayed, banner ads and similar generally accessible advertising.

Also, sponsors preferably have the ability to create: chat rooms in which the players who have selected them are able to interact with each other; resource rooms in which the sponsor provides information and/or tools that might be useful to the players (e.g., information and/or tools that are specifically tailored to the theme of the current main contest 102); and any other kind of virtual space that might be beneficial or enjoyable to the players that have selected the sponsor. As noted elsewhere herein, sponsors preferably have the ability to make similar virtual spaces available to all players (even those who have not selected the sponsor), although in most cases the sponsor will provide additional benefits to the players who have selected them, thereby encouraging players to select them. In such cases, the individual sponsors often will promote such additional benefits (e.g., by providing partial information or "teasers", or simply by describing the additional benefits) on the generally accessible virtual spaces.

Typically, the sponsors will be commercial entities that sell products and/or services. However, the sponsors can also include charitable entities or even political candidates and action groups. In fact, in certain embodiments one or more of the badges are reserved for charitable and/or political sponsors.

Typically, the commercial sponsors will compete with each other in order to entice the players to select them, so that at least one factor contributing to the selection of a commercial sponsor usually will be the benefit that the individual player expects to receive. Where some or all of that benefit is in the form of products and/or services provided by the sponsor, the selection also typically will be based upon how much the individual player values the sponsor's products and/or services. Accordingly, by appropriately tailoring the benefits provided, a given commercial sponsor often will be able to identify and (as discussed in more detail below) establish a unique relationship with its most loyal customers.

The charitable or political sponsors often will not provide benefits, or the benefits they do provide often will be less valuable than the benefits provided by the commercial sponsors. In certain embodiments, the charitable and/or political sponsors are precluded from offering benefits. Accordingly, the players' selection of these kinds of sponsors, rather than being primarily based on self interest, typically will reveal something about the players' values, attitudes or preferences. The players' choices in this regard often will help the selected charitable or political sponsor to identify potential supporters. At the same time, subject to applicable privacy issues and consents, such selection information is used in certain embodiments of the invention for more effectively targeting other kinds of marketing and/or other communications to the players (e.g., by incorporating such information into an existing profiling model).

In the preferred embodiments, one way that a sponsor can entice players to select them is by offering discounts on its products and/or services. Another is to purchase Dallions (or contest points) and then conduct their own contests (e.g., involving questions and/or competitions pertaining to their products and/or services) in which the Dallions are distributed to the winners. A still further approach is to create tasks (e.g., read certain material, watch a certain video and/or rate or evaluate a certain product) or problems (e.g., questions about their products, services, printed materials or videos) and provide Dallions to all of those who complete the task or solve the problem successfully. In certain embodiments, Dallions provided by a sponsor increase the player's total that is available for acquiring products, services or other items, but do not affect the player's competitive position vis-à-vis other players. In other embodiments, at least some of the sponsor-provided Dallions (e.g., a separate class of Dallions that may be purchased by the sponsors) are added to the player's total for purposes of determining the player's rank within the contest.

Any or all of the benefits provided by a sponsor can be limited to players who have selected the sponsor or to players who have selected the sponsor as their primary or favorite sponsor. Alternatively, any or all of the opportunities provided by a sponsor may be available to all players, but greater benefits are provided to, and/or certain advantages are given to, players who have selected the sponsor, or players who have selected the sponsor as their primary or favorite sponsor. In addition, any or all of the benefits provided by a sponsor can be increased based on the amount of time that the player has had the sponsor and/or the amount of time that the player has had the sponsor as his or her primary or favorite sponsor.

As noted above, it often is possible for the benefits provided by a sponsor to be tied into the sponsor's products and/or services, e.g., through discounts or by making the sponsored contests, tasks or problems about the sponsor's products and/or services. In other words, the provision of benefits can lead to many productive opportunities for the sponsor to communicate with its sponsored players (i.e., those players who have selected the sponsor). In addition, in the preferred embodiments the contest administrators grant the sponsors certain exclusive rights to communicate directly with their sponsored players. In one example, only sponsors are allowed to send commercial, advertising or marketing materials to their sponsored players through the contest's Website and/or contest platform/system. In another, sponsors and players are allowed to establish generally accessible chat rooms or other virtual sites within the contest system (e.g., that any player can access), but the contest administrators prohibit specified commercial content, advertising or marketing, while permitting such content on sites that are accessible only to players who have selected a particular sponsor (e.g., the sponsor associated with the virtual site). In certain embodiments, players are incentivized to report prohibited commercial, advertising or marketing communications.

In order to entice players to choose a sponsor and/or as an added benefit for the sponsor's existing sponsored players, a sponsor preferably may create a virtual site within the contest's Website and/or contest platform/system. Some portions of the site may be available to all, others only to sponsored players, still others only to sponsored players who have selected the sponsor as his or her favorite, still others only to sponsored players who have had the sponsor for some specified minimum period of time. Such a site can include, e.g., content related to the theme of an existing contest. For example, while the contest administrators are conducting a football trivia contest, extending throughout the entire football season, a sponsor might set up a reference site, with limited football statistics within one portion (e.g., the portion open to all players), more detailed statistics in another portion (e.g., the portion open only to players who have selected the sponsor), and video clips from games and interviews in a still further portion (e.g., the portion open only to players who have designated the sponsor as his or her primary sponsor).

The foregoing discussion mainly pertains to interactions between the individual player 100 and either the main contest 102 or one of the sponsor communities 103-106. Another aspect of the contest structures according to the preferred embodiments of the present invention is the facilitation of groups of players (e.g., groups 118 and 119, shown in FIG. 3) for different purposes. Sometimes these groups will be temporary, with the individual players having the ability to enter them and exit them largely at will. In other cases, the contest administrator and/or the individual sponsors establish rules about when the players can join and/or leave particular kinds of groups.

One possible kind of group, already mentioned above, is the group of players that have selected a particular sponsor. Often, a given sponsor will provide virtual spaces and other kinds of collaborative and/or interaction opportunities that attempt to maximize a sense of community among the players who have selected it, organized of course around the sponsor itself Such an approach often can not only encourage the players to select the sponsor, but also enhance brand loyalty to the sponsor in the real world. Other kinds of groups include various types of rings, such as the "team-rings" and "power-rings" discussed below, in which the players may participate for the purpose of competing during a contest.

Several variations are possible on the sponsorship structure described above. For instance, it is possible to allocate Dallions among the sponsors in different ways. According to one approach, each of the sponsors is provided a fixed number of Dallions. With such an approach, the sponsors might compete against each other to attract the greatest number of players to select them (e.g., by offering other kinds of benefits), without any particular sponsor having a benefit in terms of numbers of Dallions to distribute. Alternatively, the individual sponsors could determine the number of Dallions they wish to purchase for distribution to the players that have selected them. In such a case, the sponsors still can compete against each other for the greatest number of players, but here each sponsor can determine for itself whether it is more cost-effective to purchase additional Dallions or use their financial resources to provide other benefits to such players. In a still further embodiment, each sponsor is provided a number of Dallions to distribute based on the number of players who have selected such sponsor (e.g., with a fixed number of Dallions for each player). As a result of this approach, players do not have to worry that a particular sponsor has become so popular that their chances of winning Dallions from that sponsor would be significantly diluted, thereby providing a reason for them to find a different sponsor than the one they otherwise would have chosen. On the other hand, for the same reasons such an approach would work well if there was a desire to spread the players more or less evenly out amongst the participating sponsors.

As noted above, one aspect of certain embodiments of the present invention is that sponsors may compete against each other, either on an informal basis or pursuant to a competition that is recognized by the administrators of the overall contest 102. In one such competition, the sponsors try to attract the greatest number of players to select them. In this case, the contest administrators might feature the sponsor who has attracted the most player selections and/or the sponsor from each designated category who has attracted the most player selections.

In addition to, or instead of, competing based on the sheer numbers of players who have selected them as sponsors, the sponsors also may compete based on the quality of the players who have selected them. For example, the sponsors might compete to see who has the most players in the top N rankings of the main contest 102, periodically throughout the contest 102 and/or at the conclusion of the contest 102, where N might be 1, 10, 20, 50, 100 or any other pre-specified number. The advantage of choosing a high value for N (e.g., 20, 50, 100 or even higher) is that the sponsors are incentivized to try to appeal to a more broad-based set of players.

Still further, the sponsors might compete based on the total aggregate Dallions earned by each of their top M players, where M might be 5, 10, 20, 25 or any other pre-specified number. Again, by using a higher value for M (e.g., a minimum of 10 or 20), the sponsors are incentivized to try to appeal to a more broad-based set of players. At the same time, in certain embodiments it would be preferred to limit M (e.g., to no more than 50 or some specified percentage of the total number of players), so as not to unduly favor large sponsors who are able to attract larger numbers of players.

In any of such sponsor competitions, the administrators of the main contest 102 might publish the rankings of the sponsors. Alternatively, or in addition, the administrators of the main contest 102 might list the sponsors' names (or at least the principal sponsors' names) together with the highest-ranking players who have selected them (e.g., in the portion of the contest's site where such player rankings are displayed).

In certain embodiments of the invention, players are eligible to obtain larger number of Dallions from the sponsors they have selected than they otherwise would be entitled to obtain in the same circumstances. For instance, a policy might be established (either by the contest administrators or by a particular sponsor) that a player will be entitled to a bonus number of Dallions (e.g., a fixed percentage more) if the player has designated the sponsor as his or her primary sponsor. Similarly, a policy might be established (either by the contest administrators or by a particular sponsor) that a player will be entitled to a bonus number of Dallions (e.g., a fixed percentage more) from a selected sponsor if the player has selected fewer sponsors than the maximum number that he or she was entitled to select.

Depending on the particular embodiment, a player might be able to select and/or replace sponsors at any desired time, or else might be constrained as to when sponsors may be selected and/or replaced with other sponsors. For example, players might be constrained to selecting sponsors only at the beginning of a contest (i.e., precluded from replacing sponsors during a contest), or might be allowed to switch sponsors only at certain specified times (e.g., times corresponding to when the sponsors are allocated additional Dallions).

Contest Player Interface Program

In certain embodiments of the invention, the individual players access information for main contest 102 through a Web interface using a generic Web browser. However, in the preferred embodiments the players also (or instead) can access such information through a separate, dedicated and/or stand-alone application that resides on their networked devices 21-24. More preferably, such an application is implemented as a desktop widget or any other application that can be opened, used and then closed independently of the opening, use and closing of the player's generic Web browser.

Figure 4:
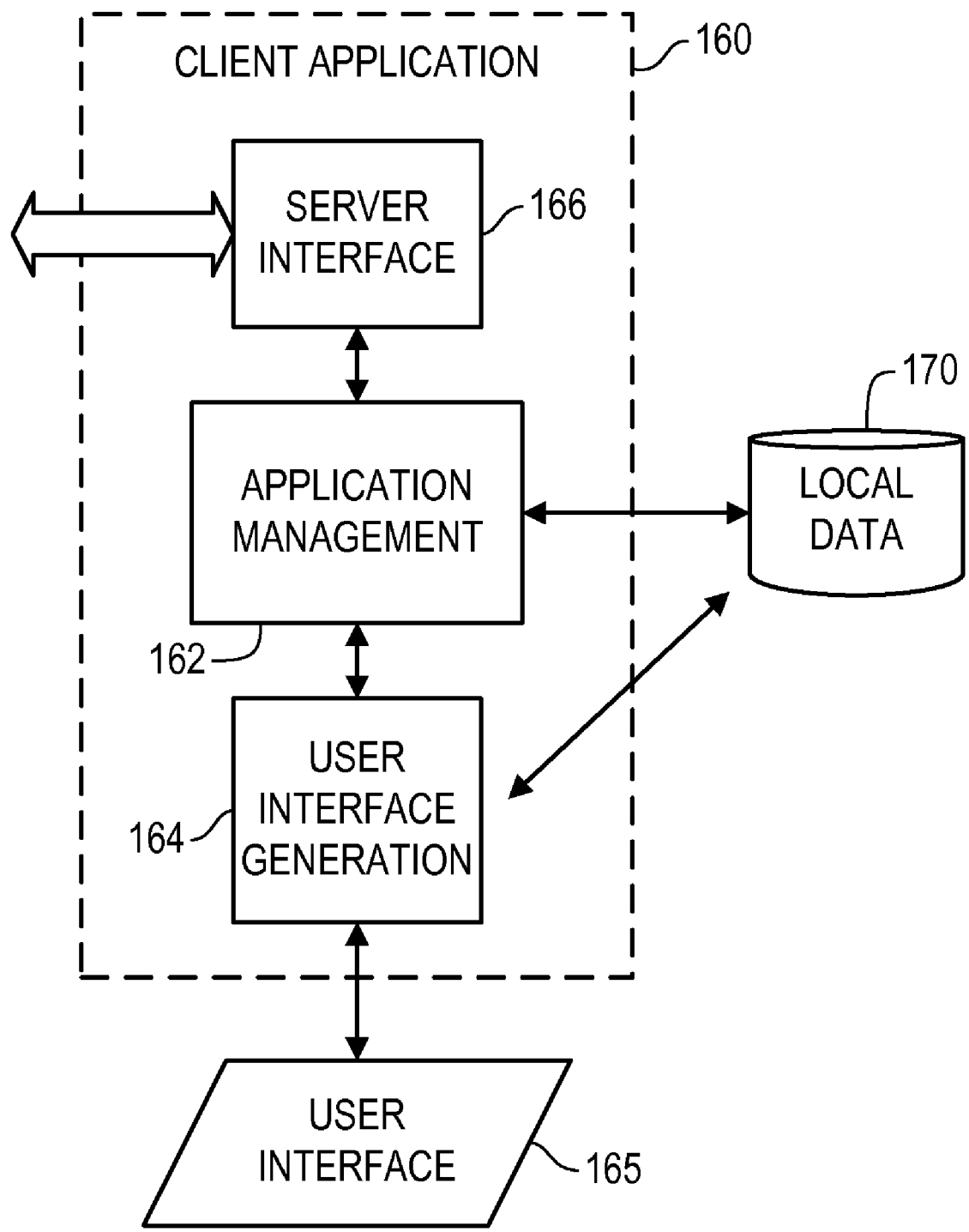
FIG. 4 is a block diagram illustrating a contest player's device application, in use, according to a representative embodiment of the present invention.

One example of such an application 160 is shown in FIG. 4. In the preferred embodiments, the functionality of application 160 is performed by a general-purpose processor within the subject player device 21, with such processor reading computer-executable process steps from a computer-readable storage medium (within or attached to the player device 21) and then executing such steps. When referring to a single player device (e.g., one of devices 21-24) herein, reference usually is made to device 21, for ease of reference only; such references are not intended to be limiting in any manner.

In the present embodiment, application 160 conceptually can be divided into several components, e.g., as follows. Application management component 162 performs the central functionality of, as well as data management services for, application 160. User interface generation component 164 generates and manages the user interface 165 through which the player (e.g., one of the players 31-33) communicates with the application 160. Server interface 166 and manages communications with the contest server 12 across the applicable network.

As discussed in greater detail below, user interface 165 preferably includes at least a visual interface on the player device's display. That visual display preferably includes multiple different portions, as well as different pages that may be navigated by the player. The entire user interface 165 preferably is generated from an internal template that is stored in device memory or storage 170 as part of, or in conjunction with, the application 160. The template includes different "skins" that can be selected at different times (e.g., by the player, automatically by the application 160 itself based on the time of year or other considerations, and/or based on instructions received from contest server 12 through server interface 166.

In any event, all or almost all of the structure, navigation capability and other functionality of user interface 165 preferably is provided by application 160, so that only current raw data pertaining to the contest is retrieved from server 12 (through interface 166). Also, in order to further limit the amount of communications with server 12, application management component 162 preferably can be configured (e.g., by the player or by its developer) to cache some or all of such data into the device's memory or storage 170.

Initially, the player opens application 160, and it logs the player into server 12, providing the player with all access to the contest information that the player's status warrants. For this purpose, the player might be asked by interface 165 for his or her user name and password. Alternatively, application management component 162 might have previously stored such information into storage device 170 and simply retrieve it and provide it to server 12 (through server interface 166) upon instantiation.

Thereafter, as discussed in greater detail below, the player preferably has the ability to access different portions of the user interface 165, in some cases navigating to different "pages" of it. For example, the player might request retrieval of profile information for other players through interface 165. Each such retrieval request could result in an immediate request for the desired information from server 12. Alternatively, the entire directory of profile information could have been previously stored in storage device 170, e.g., with periodic synchronization to the corresponding database in server 12, so each such retrieval request can be satisfied locally. Still further, a hybrid approach can be adopted, with the data retrieved locally (e.g., the text information and/or an index for the text information) and some retrieved from server 12 (e.g., photograph or image information that has not previously been retrieved).

Figure 5:
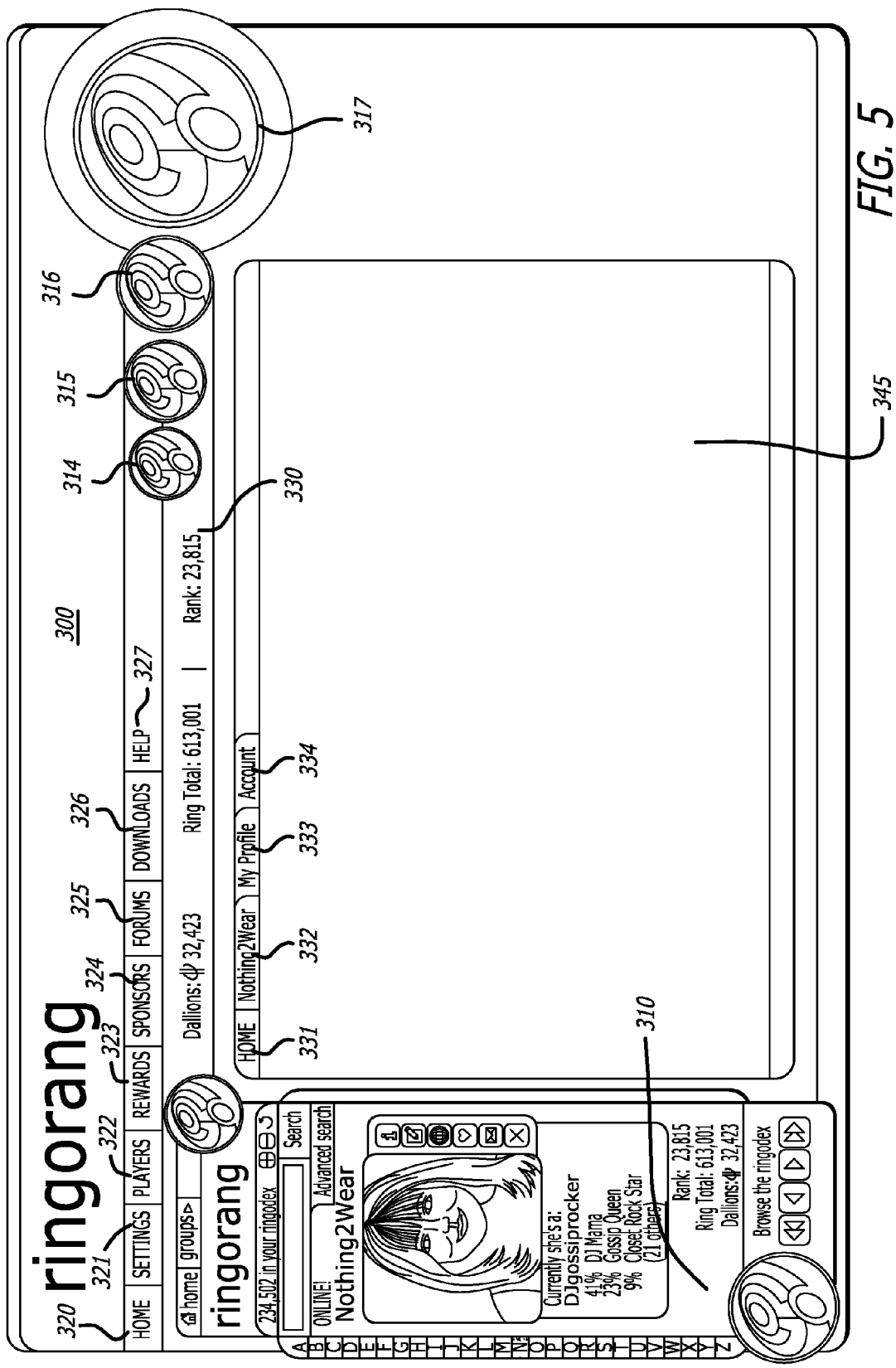
FIG. 5 illustrates the main components of the home page for a user interface according to a representative embodiment of the invention.

FIG. 5 illustrates the main components of the home page 320 for a user interface 300 (e.g., one example of user interface 165), according to a representative embodiment of the invention. In certain embodiments, user interface 300 is provided entirely by server 12 (e.g., through a Website), and in other embodiments it is provided by the player application 160 running on player device 21 that is in communication with the server 12. As shown, user interface 300 includes multiple different sections, including, e.g.: a player-access interface section 310 (often referred to herein as the "Ringodex™"); multiple sponsor display sections 314-317 for displaying indicia of player sponsor selections (often referred to herein as "badges"); a set of navigation tabs (or links) 320-327 for accessing different pages of the user interface 300; player-status summary area 330; display tabs (or links) 331-334; and main display area 345.

In the preferred embodiments, a player can navigate around user interface 300 (e.g., by clicking any of navigation tabs 321-327 and/or display tabs 331-334), thereby sometimes causing the content of main display area 345 to change, but the content displayed by the Ringodex 310 is solely a function of the user interface controls within the Ringodex 310 itself. Thus, in the preferred embodiments of the invention, the Ringodex 310 largely functions as a substantially independent sub-interface.

In the present embodiment, Ringodex 310 is a compact interface that allows the player to identify and communicate with other players. More preferably, Ringodex 310 allows the player, among other things, to: search for other players; display pictures, statistics (e.g., contest-performance statistics) and information regarding them; send messages (such as invitations, challenges or arbitrary text messages) to them; and/or track individual players or groups of players (e.g., with respect to contest performance statistics, ring associations or any other contest information).

In the present embodiment, the badges 314-316 indicate up to three sponsors (e.g., corporate, commercial or charitable sponsors) that the player has selected, and the "FAVORITE" badge 317 indicates which of those three the player has designated as his or her "primary" sponsor. Alternatively, with the configuration shown in FIG. 5, each of the badges 314-317 can indicate a different sponsor (i.e., up to four total), with "FAVORITE" badge 317 again being the primary sponsor. Still further, it is noted that any other maximum numbers of total and/or favorite sponsors may be accommodated in alternate embodiments of the invention.

In order to add or change the designated sponsors, the player clicks on the "SPONSORS" tab 324, which preferably causes a set of available sponsors to populate the main display area 345. Then, the player simply drags, clicks on or otherwise designates the desired sponsor logos (or other sponsor indicia) in order to assign them to the desired ones of the badges 314-317. Other than any changes made pursuant to such sponsor-assignment actions, the individual badges 314-317 preferably continually display the logos or other symbols of the player-selected sponsors. Each currently unassigned badge preferably displays a default symbol, such as the logo for the contest itself (with all of the badges being represented as unassigned in FIG. 5).

Player-status summary area 330 preferably continuously displays certain pre-specified statistics regarding the player (particularly the player's performance in the contest), irrespective of other content changes as a result of the player navigating around the interface 300. Depending upon the particular embodiment, those pre-specified statistics can indicate the same parameters across all players, or the parameters that are displayed in summary area 330 can be customized by the individual player (e.g., through the SETTINGS page 321).

In either event, examples of such parameters include: total number of points (called "Dallions" in the present example) won or presently held; rank of a group or team (typically referred to as a "ring" in the present example) to which the player belongs, e.g., relative to other groups or teams, respectively (called the player's "Ring Total" in the present example); indications of the player's own overall rank or the player's rank within a particular contest, competition or tournament (identified simply as "Rank" in the present example); aggregate number of points of everyone within the player's ring (not shown in the present example); measures regarding current competitive position, e.g., as might affect ability to win points in the future, such as the number of players in the player's ring (not shown in the present example); and/or name(s) of the contest(s), competition(s) and/or tournament (s) in which the player currently is competing (not shown in the present example). It is noted that the indication of the player's current Dallion (or point) count can either reflect the player's overall earnings or can reflect the player's current balance i.e., overall earnings minus Dallions used to redeem prizes and/or Dallions used or given for other purposes. The indication of rank reflects how good the player is relative to all other players and can be based, e.g., on question accuracy (percentage correct versus incorrect), on total Dallions earnings, or on a formula that takes account of how many questions have been answered (e.g., so that a player having answered just one question and answered it correctly would not be ranked at or near the top).

In the preferred embodiments, the content and/or user interface controls that are presented within main display window 345 are controlled through a combination of navigation tabs 320-327 and display tabs 331-334. Each of navigation tabs 320-327 preferably corresponds to a different category of functionality and/or information (e.g., HOME 320, SETTINGS 321, PLAYERS 322, REWARDS 323, SPONSORS 324, FORUMS 325, DOWNLOADS 326 and HELP 327). Clicking on any one of navigation tabs 320-327 preferably results in the corresponding page populating the main display area 345. At the same time, in the present embodiment such a selection causes the labels, functions and/or numbers of one or more of display tabs 331-334 to change.

In one representative embodiment, the display tabs 331-334 correspond to sub-pages of, or pages related to, the currently active navigation tab (i.e., the tab currently selected from among navigation tabs 320-327); accordingly, all of the display tabs 331-334 are different, depending upon which navigation tab currently is active. In other embodiments, at least one of the display tabs 331-334 is persistent, meaning that it always links to the same page irrespective of which one of links 320-327 currently is active. In a further embodiment, only a single display tab (e.g., the leftmost display tab 331) is modified to link to the page of the currently active one of the navigation tabs 320-327, and all of the other display tabs persistently link to the same pages irrespective of which one of navigation tabs 320-327 currently is active.

In the current embodiment, the leftmost display tab 331 reflects the currently selected navigation tab from the set of navigation tabs 320; display tab 332 links to the page for the player who is currently active (displayed) on the Ringodex 310; display tab 333 links to the player's own profile page; and the final display tab 334 links to the player's account page. As noted above, the main display area 345 preferably displays the content of the currently selected one of display tabs 331-334.

In the embodiments discussed above, game-based information and functionality is available through a single user interface 300. Depending upon the particular contest being implemented, an additional player application, such as the alert-based client discussed in the '179 Application, sometimes is provided on the player device 21, e.g., for the purpose of delivering questions and/or problems to the various players. Otherwise, the players generally can access contest information, make strategic decisions, change settings, contact other players and the like through user interface 300. In other embodiments, the alert-based client discussed in the '179 Application is incorporated into application 160 and/or user interface 300.

Certain embodiments of the present invention provide a player application through which the player can access some portion of the controls and/or information that is available through the full user interface 300, i.e., an abbreviated user interface provided by a player application running on player device 21. Such an abbreviated user interface may be in addition to, be instead of, incorporate, or be incorporated within, the alert-based client discussed in the '179 Application.

As noted above, the entire user interface 300 can be configured as a dedicated player application. However, the present abbreviated user interface preferably is smaller, while still allowing a player to access some or all of the most commonly used functionality. In addition, the abbreviated user interface can include one or more links that open up the full user interface 300 (which, e.g., can be Web-based, generated by the same player application that generates the abbreviated user interface, or generated by a separate player application) or another user interface that is larger than the abbreviated user interface. The player application providing the abbreviated user interface preferably communicates with server interface 166 (shown in FIG. 4), in order to communicate with server 12 and, e.g., thereby exchange contest information.

More preferably, such an abbreviated user interface mainly includes player-access functionality, e.g., identical or similar to Ringodex 310. In this case, because the player application generating the Ringodex runs on the player's computer or other networked player device 21, separately from the player's browser, the interface can, e.g., be configured and sized so as to allow the player to have quick and easy access to other contest participants/players, without opening the browser or navigating to any particular Web page. As an additional result, the standalone Ringodex interface typically can be somewhat larger and have additional functionality, as compared with a player-access interface 310 that is incorporated within a larger user interface 300 (such as a Web page) and that therefore must compete for space with other information and user interface elements within that larger user interface 300.

Figure 6:
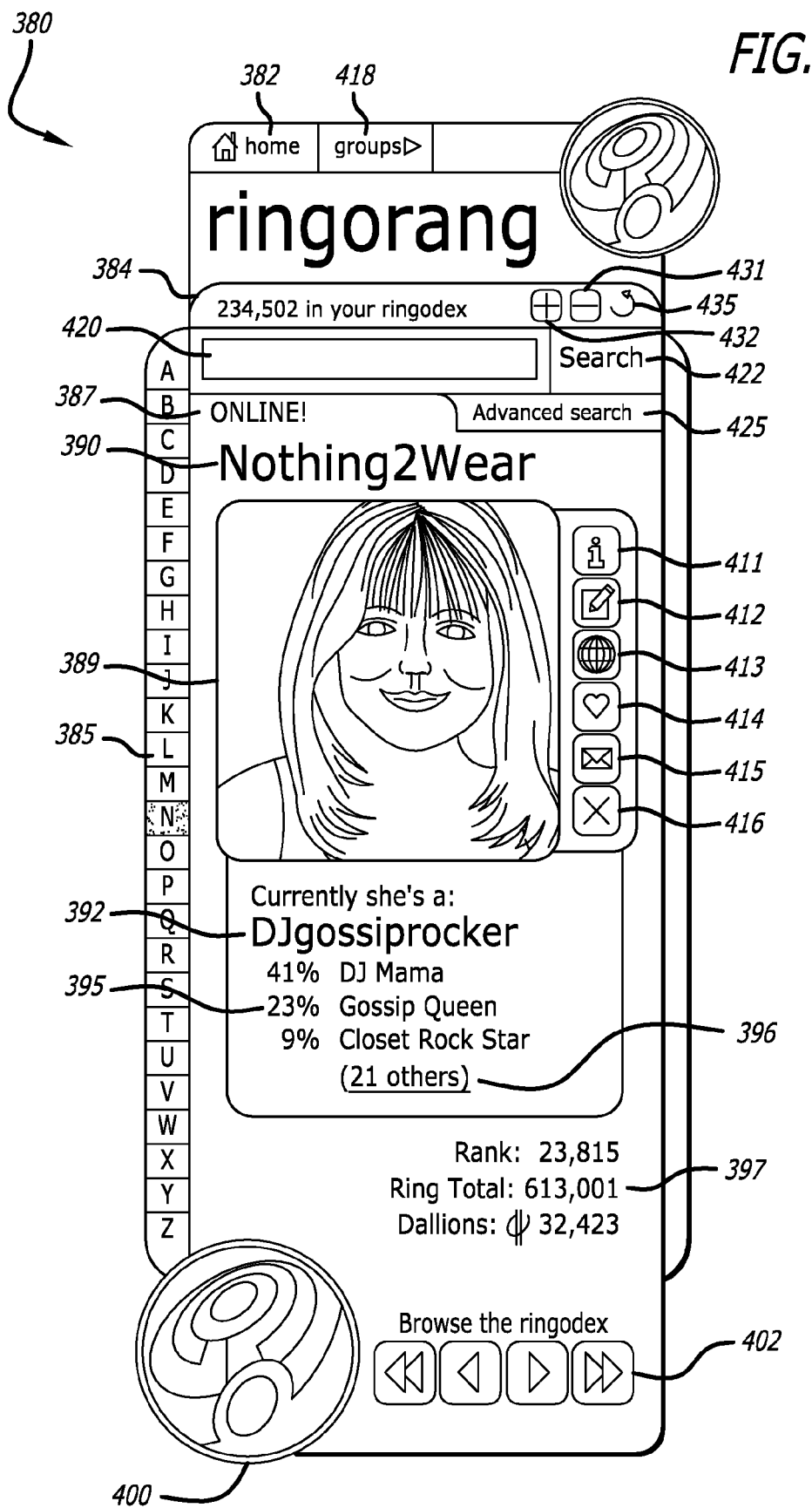
FIG. 6 illustrates a player-access interface according to a representative embodiment of the present invention.

A more detailed example of a player-access interface (or Ringodex) 380 is illustrated in FIG. 6. Generally speaking, Ringodex 380 is very similar to Ringodex 310, just including a couple of additional user interface elements. However, it should be noted that either of Ringodex 310 or Ringodex 380 can be implemented within a larger user interface 300 (such as a Webpage) or as a standalone interface.

One of the main features of Ringodex 380 is to display information profile "cards" for contest participants/players. As discussed in more detail below, the player preferably has a number of ways in which to select the player whose card is to be displayed. In addition, a Home button 382, when clicked, brings up the player's own card.

A Total Profile Indicator 384 indicates how many profile cards currently are "contained within" the Ringodex 380. The default for this number preferably is the total number of players registered with the contest system 10 or, in some cases, the total number of players participating in a particular contest (e.g., as selected by the player from within the SETTINGS page 321). When the player executes a search, e.g., utilizing the search controls described below, the number shown by Total Profile Indicator 384 preferably changes to indicate the number of profile cards that satisfy the search. It should be noted that the concept of profile cards being "contained within" the Ringodex 380 is a virtual concept; in fact, all of the profile cards typically will be maintained by server 12 and those that are "contained within" the Ringodex 380 simply constitute the set or subset that currently is accessible through the Ringodex 380, e.g., that may be navigated using the Alphabet Tabs 385 and browsing controls 402 or that may be searched (or further searched) using the search tools discussed below.

All profile cards currently within the Ringodex 380 preferably are sorted alphabetically by username. Accordingly, the Alphabet Tabs 385 along the left side of Ringodex 380 allow the player to quickly access specific profiles of players whose usernames are known. In alternate embodiments, the profile cards are sorted by the players' real names or the player has the option to choose how they are to be sorted (at least for purposes of the Alphabet Tabs 385).

Login Status Indicator 387 preferably indicates the status of the player whose profile card currently is being viewed. Its value can be, e.g., either "offline" or "online", i.e., logged into the contest Website or not. By default, login status preferably is viewable to all. However, in certain embodiments of the invention, individual players have the ability to select an option to hide their status to other players (either all players, specifically designated players, or all players other than specifically designated players), in which case the player always would be shown as being "offline" or the Login Status Indicator 387 would provide a third designation, such as "status unavailable", to those other players. Preferably, players from whom the player's status is hidden do not have the ability to contact the player; in addition, in certain embodiments such players have limited or no access to the information in the player's profile card, such as only being able to see that the username exists.

The profile card for a particular player preferably provides various kinds of information about the player. For example, Image pane 389 displays a photograph or graphic image that has been uploaded by the player whose profile card is being viewed, Username 390 indicates the username that has been selected by that player, and Identifier 392 indicates an identifier or characterization that has been assigned to the player.

In this latter regard, one aspect of certain embodiments of the present invention is the generation and assignment of a preferably dynamic identifier (i.e., one that is capable of changing over time) for some or all of the players. Preferably, the identifier is based upon the categories in which the particular player excels. The number of categories upon which the identifier is based can be fixed (such as the player's top three categories) or variable (such as all categories in which the player has achieved a specified competence level, possibly subject to a maximum number and/or including a minimum number even if the player has not achieved the requisite level). In any event, some set of one or more categories preferably is determined based on player competence. In the preferred embodiments, the identifier is generated automatically by concatenating short standardized references to such categories (e.g., in the order in which the player is most competent). For example, a player who excels in film questions might earn the designation "Movie Buff" and its short standardized reference (or root) "cine". Optionally, a standard suffix (e.g., "head") or a selected suffix from a set of standardized suffixes (e.g., as discussed below) may be appended to the end of the concatenation and/or a standard prefix (e.g., "Master") or a selected prefix from a set of standardized prefixes (e.g., as discussed below) may be appended to the beginning of the concatenation.

The short standardized category references may be customized based on the competence level that the player has achieved (i.e., on a category-by-category basis). Alternatively, or in addition, the suffix (if used) may be customized based on an overall competence level that the player has achieved (e.g., "head", "master", "laureate" or "genius" for increasing levels of competence). Similarly, the prefix (if used) may also (or instead) be customized based on overall competence level (e.g., "Mr./Ms.", "Master", "Prof." or "Dr." for increasing levels of competence).

In the present embodiment, the players' top three categories are used, with "top" being defined as those categories in which the subject player has the highest percentages of correct responses. In the specific example shown in FIG. 6, the top categories for the player whose card is being displayed are "DJMama", "Gossip Queen" and "Closet Rock Star", having respective short standardized references of "DJ", "gossip" and "rocker", respectively. Therefore, in the present embodiment, the identifier 392 for this player is "DJgossiprocker". In alternate embodiments, hyphens or other punctuation or symbols are automatically inserted between the individual references (e.g., resulting in "DJ-gossip-rocker" in this example) and/or the suffix "head" is attached to the overall concatenation (e.g., resulting in "DJgossiprockerhead" in this example).

Underneath Identifier 392 is certain category information 395 that, in the present example, includes the full names of the designations from which the Identifier 392 is constructed, along with a score or percentage indicating how good the player is at that subject, e.g., relative to other subjects. In the present example, only the three categories that make up Identifier 392 and their scores are displayed, although a link 396 allows the player to view the player's scores in the other 21 categories, together with all other information in the player's full profile. If Ringodex 380 is a part of the full interface 300, then this information preferably is provided in the main content window 345; on the other hand, if Ringodex 380 is a standalone interface, then a new window providing a larger interface than Ringodex 380 (e.g., interface 300 or another Webpage) preferably is opened (e.g., by first opening a browser) in order to provide additional space to display such information. It is noted that in alternate embodiments any other number of categories may be initially displayed, and/or any other information may be provided in the main display area of Ringodex 380 or such other larger interface.

Ringodex 380 preferably also displays contest summary information 397 for the player whose profile card is being viewed. As shown, such summary information 397 preferably is the same as (or substantially the same as) the information provided for the player in player-status summary area 330 of interface 300.

Primary Sponsor Badge 400 shows the symbol or logo for the primary sponsor of the player whose profile card is being viewed. If the player has not chosen a primary sponsor, then a default "empty" badge (such as the contest's logo) preferably is displayed. In certain embodiments in which Ringodex 380 is part of the overall interface 300, clicking on badge 400 causes the main content window 345 to load the SPONSORS screen, thus duplicating the function of the SPONSORS link 324, so that the player can browse other badges. On the other hand, if Ringodex 380 is a standalone interface, then clicking the Primary Sponsor Badge 400 preferably first opens interface 300 (e.g., through a browser) and then loads the SPONSORS screen. In certain embodiments, Primary Sponsor Badge 400 provides the player with an option to add the identified sponsor as his or her own primary sponsor and/or as one of his or her other sponsors. In addition, or instead, Primary Sponsor Badge 400 links to a page for the sponsor that exists within contest's site or links to the sponsor's website directly.

The foregoing discussion provides examples of the kinds of information that may be included within a player's profile card. However, it should be noted that in other embodiments, any other player profile information may also (or instead) be displayed in the main viewing area of Ringodex 380.

Controls 402 for browsing through the various profile cards contained within Ringodex 380 preferably also are provided within the Ringodex 380. More preferably, with these controls the player has the option to move backward or forward (e.g., in alphabetical order) one profile card at a time, or to fast-forward or fast-reverse in order to reach a particular point. In certain embodiments, only the Username field 390 is displayed while fast-forwarding or fast-reversing, and the entire profile card is only displayed after the player pauses for some minimum specified period of time (e.g., 1-2 seconds). In other embodiments (e.g., where greater bandwidth is available), the entire profile cards are displayed during fast-forwarding and fast-reversing.

View Profile button 411, when clicked, displays the full profile for the player whose profile card currently is being viewed. If Ringodex 380 is a part of the full user interface 300, clicking on button 411 preferably fills the main content window 345 with such information. If Ringodex 380 is a standalone interface, then clicking the View Profile button 411 preferably first opens interface 300 (e.g., through a browser) and then loads such information into main content window 345.

View Stats button 412, when clicked, displays additional statistical information for the player whose profile card currently is being viewed (beyond the limited statistics provided in the default display), preferably within Ringodex 380 itself. In the preferred embodiments, the player's Identifier 392 is replaced with game, contest and/or tournament performance statistics, such as accuracy percentage, total questions correct, and/or consecutive correct-answer streak. In addition, or instead, such statistics can include team or ring performance and/or the player's performance relative to other ringmates or teammates.

View Ring button 413, when clicked, displays information (or additional information) regarding the ring or team of which the player (whose profile card currently is being viewed) is a member. In the preferred embodiments, it displays the name of (or other identifier for) the ring, either below the photo or in the main content window 345, and in certain embodiments provides other information about the ring, such as a list of (e.g., serving as links to the profiles for) the members of the ring and summary statistics regarding them. Such summary statistics can include, e.g., categories of summary statistics that have been selected by the player from the SETTINGS page 321 and can also be implemented as links, e.g., thereby providing drill-down capabilities.

Track (or Add to Favorites) button 414 allows the player to mark the player whose profile card currently is being viewed as someone who should be included within a specially designated set or group. That set or group, in turn, preferably can be used as a "favorites" folder, holding (or, more preferably, linking to) a group of profile cards that the player might want to check frequently. In addition, or instead, the set can, in certain embodiments, be designated for automated tracking, e.g., based on parameters specified by the player (such as "notify me if any of the players in the set exceeds a specified number of Dallions"). In some embodiments, just a single such set or folder exists; and in other embodiments multiple different sets/folders/groups can be defined by the player, and Track button 414 opens a drop-down list from which the player can designate the desired one for. In the preferred embodiments, the list of tracked players (for any given set) appears as a list that is viewable in the main content window 345, rather than the Ringodex 380. However, in certain embodiments the contents of the Ringodex 380 can be set to the members of a particular group, e.g., by clicking on 'groups' button 418, which opens a drop-down list, and then clicking on the desired group name in the drop-down list.

Send Message button 415 allows the player to send a message to the player whose profile card currently is being viewed or, in certain embodiments, to all members of the currently selected group. In the preferred embodiments, the player has the ability to compose a free-form message and/or to select one or more messages from a set of predefined messages (such as: an invitation to join the player's ring; a request to join the player's ring; a request to form a ring; or a challenge that requests the other player to compete, e.g., one-on-one, against the player).

Block button 416 blocks the player whose profile card currently is being viewed from seeing the player's status 387, viewing the player's profile card, inviting the player into a ring and/or messaging the player. The specific effect of Block button 416 can, e.g., be defined by settings previously configured by the player and/or at the time the Block button 416 is clicked, e.g., by opening a drop-down menu from which the player can define the extent of the "block".

Ringodex 380 preferably also provides both basic and advanced search features. With respect to the former, the player preferably can query by username, simply by entering the desired query into window 420 (e.g., using Boolean searching, wildcard characters and/or other known searching tools) and then clicking Search button 422.

With respect to the latter, clicking on Advanced tab 425 preferably unfolds a "drawer" giving the player options for entering more specific or targeted search criteria, such as by permitting searching across any combination of a variety of different parameters. In the preferred embodiments, such parameters can include any or all of: game performance statistics (e.g., rank, Dallions or points earned, accuracy percentage, accuracy percentage by category or accuracy percentage within a specified time period); geographical parameters (e.g., location of the players by city or ZIP code); chosen sponsor badges; identifier components (i.e., the subjects in which a player excels); ring or team membership; or any character string, word or keyword in a player's profile.

Figure 7:
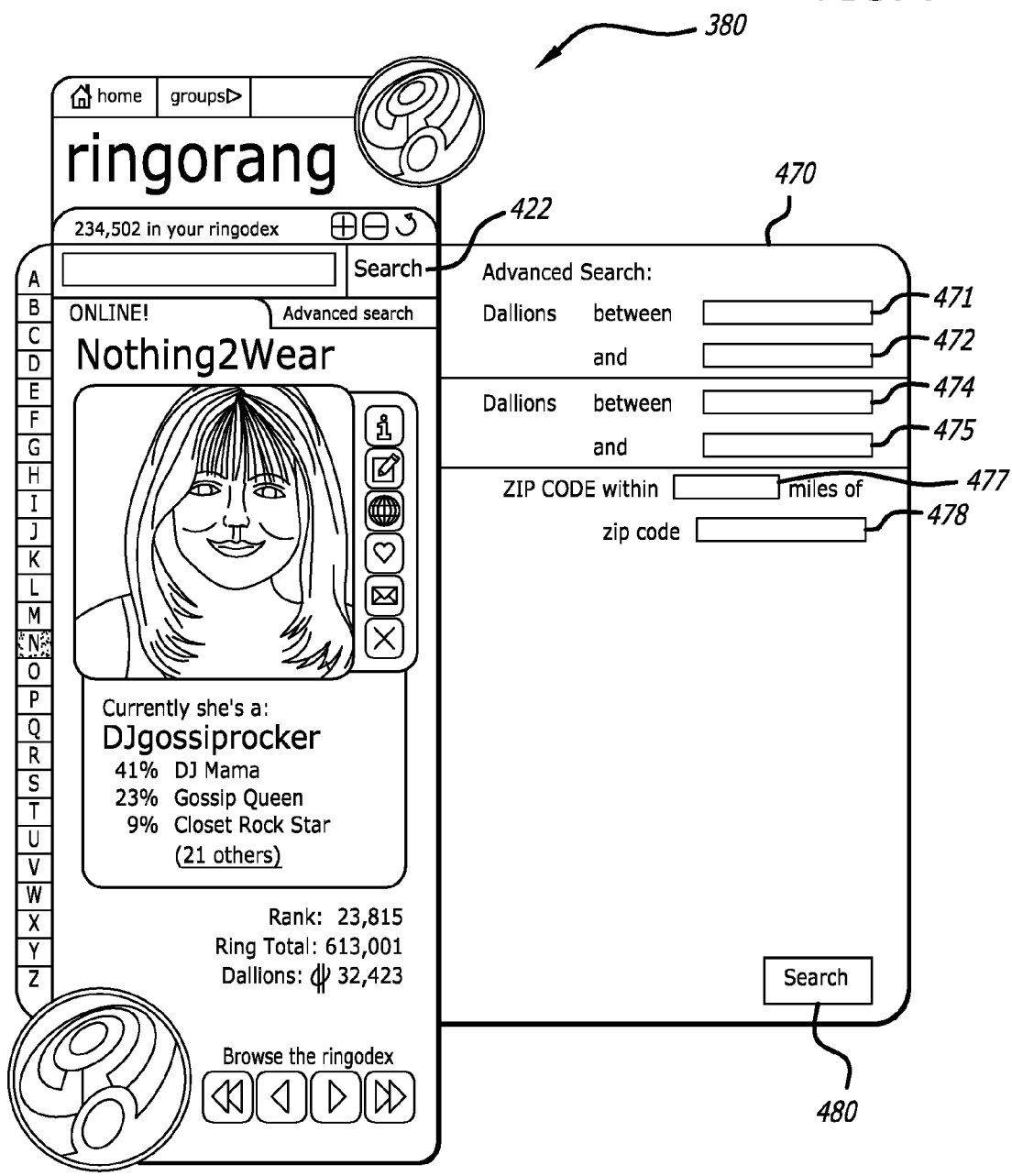
FIG. 7 illustrates an example of an extended player-access interface.

An example of a drawer 470 that can be opened through Advanced tab 425 is shown in FIG. 7. Here, the player can specify a minimum 471 and/or maximum 472 rank, a minimum 474 and/or maximum 475 Dallion or point total, and/or a ZIP code 478, with or without specifying a maximum distance 477 from that ZIP code. After clicking on the Search button 422 (or search button 480), the returned search results are those that meet the conjunctive criteria specified by the player in drawer 470.

In the event of either a basic or advanced search, the result(s) preferably form the new basis for navigation within Ringodex 380, i.e., limiting the profile cards contained within Ringodex 380 prior to search in accordance with the search criteria. For example, after the search, the player preferably can browse through the search results using browsing controls 402 or using address tabs 385 in order to jump to usernames beginning with a particular letter. In addition, multiple consecutive searches preferably can be performed, limiting earlier search results so that the player can incrementally focus down more narrowly until a set of desired size is achieved.

Returning to FIG. 7, while browsing through the search results (resulting from a basic or advanced search), the player can click on the 'minus' sign 431 to remove the present profile card from the search results. At any time, the player preferably has the ability to save the search results as a group or a set of profile cards, e.g., designating any desired label for such group or set. The player preferably also can add the currently displayed profile card to an existing grouping by clicking on the 'plus' sign 432. Once the player is finished with the present search results, he or she can click on the 'refresh' button 433 in order to clear the search results and revert the Ringodex 380 to the default, i.e., all player profile cards in the contest universe or, in certain embodiments, to the state of the Ringodex 380 immediately prior to the current search.

As noted above, the foregoing groups or sets of profile cards (more preferably, links to such cards) are accessed in the present embodiment by clicking on the 'groups' button 418, which then displays a drop-down list of existing groups, allowing the player to select one. It will be really appreciated that the Ringodex 380 according to the preferred embodiments permits the player to navigate through different groups of profile cards, with the currently active group being defined in any of a variety of different ways, e.g., the entire universe of profile cards, a previously stored group, a group defined by the results of a current search, or a group initially defined by search results but then modified by removing individual profile cards.

In addition to (or instead of) the search results being displayed through the Ringodex 380, in certain embodiments or in certain cases (e.g., depending upon player settings) the search results are displayed in the main content window 345 (or some other interface that is larger than Ringodex 380), e.g., with profile pictures and usernames. Clicking on any given entry in such search results preferably causes the corresponding profile card to be displayed by the Ringodex 380 or, in alternate cases or embodiments, causes the entire profile card to be displayed within the main content window 345 (or such other larger interface).

In all cases, the player preferably has significant flexibility in determining what information is provided in response to designations of a specific user interface controls, as well as how such information is displayed, e.g., through the SETTINGS page 321. For example, in certain embodiments in which the Ringodex 380 is implemented as a standalone interface, the player has the ability to determine which user interface controls within Ringodex 380 open the full interface 300 for viewing detailed information and which interface controls within Ringodex 380 merely display summary information within the more spatially limited Ringodex 380 interface.

The foregoing discussion concerns, among other things, a player-access interface (typically referred to herein as the Ringodex). A variety of different configurations and/or features may be provided within the Ringodex, but in the preferred embodiments the Ringodex primarily functions as a small, dedicated, largely self-contained social interface for the contest. When implemented as a standalone interface, the Ringodex preferably is downloaded by the player, e.g., from the server 12.

Contest Features

A contest according to the present invention preferably involves a plurality (e.g., hundreds, thousands or tens of thousands) of geographically dispersed players (e.g., located all over the country), playing over the Internet or another publicly accessible network, although certain embodiments may be specifically directed toward smaller less geographically dispersed players. Examples of the latter include various localized contests (such as a scavenger hunt) and contests primarily directed to particular individuals. The overall contest structure in the preferred embodiments of the present invention includes multiple individual contests, each typically involving questions to be answered or other problems to be solved and often being played over an extended period of time, such as anywhere from several days to a month, or even longer.

More preferably, a contest site is maintained by server 12 and provides an ongoing contest structure that serves as a kind of umbrella for multiple different contests. As a part of that structure, server 12 makes available a number of problems to be answered/solved by the various players. In the preferred embodiments, different contests sometimes are superimposed on some of the same problems so that, e.g., two different players might be answering the same question at the same time but competing in two different contests.

In one particular example, a stream of problems, taken from various subject-matter categories, is provided by server 12. Using this problem stream, a one-month general-knowledge contest is defined, beginning at a specific starting date. Then, problems are selected (e.g., randomly or based on expressed preferences as to time of day) from the stream and made available to the players (e.g., 1-3 new problems per day). At the same time, another contest is defined as a football-themed contest that extends throughout the entire football season, and only the football-related questions are extracted from the stream and delivered to the players.

While the various players are participating in different contests, the same kinds of points (typically called "Dallions" herein) preferably are earned across all contests and, in some cases, are capable of being earned independent of any contest. These Dallions preferably can be exchanged or redeemed for products, services or other items (e.g., items within a virtual environment, as discussed below). In fact, in some embodiments the players even have the ability to suggest items that they would like to be able to acquire with their Dallions.

As a result of this overarching contest structure and common currency, the individual players preferably maintain a persistent presence within the contest structure hosted by server 12, from time to time selecting contests in which to compete and/or other activities in which they may acquire additional Dallions. Meanwhile, the use of a single problem stream across multiple different contests provides both efficiency for the contest administrators and personalized selection by the various players.

The contests of the present invention can include substantially simultaneous delivery of problems to the players, e.g., as described in the '179 Application. In addition, or instead, problems may be delivered to players on any other basis (either as part of a contest or as an opportunity to earn Dallions for a correct response, independent of any contest).

For instance, a problem may be delivered to a player based on geographic location using global positioning system (GPS) information or any other kind of positioning information (e.g., cellular-based triangulation positioning information), which typically will be derived from the player's device 21. In one specific example, a player is delivered a question regarding a landmark or a commercial establishment that the player is near, in response to such positioning information.

In another, a player is delivered geographically based clues in connection with a scavenger or a treasure hunt. In certain embodiments, such scavenger/treasure hunts involve other people, e.g., where other people are or have the answers to particular problems, or are or have additional clues, thereby leading the players to interact with each other. In one example, a player is tasked with finding people having specific expertise to aid him or her in answering a question or solving some other problem. In certain embodiments, scavenger/treasure hunt missions are multi-player only, and therefore must be played by Rings.

Problems also may be personalized to the player in other ways, e.g., based on activity conducted on the player's device 21. More specific examples include questions related to the player's: Web browsing history, previous text messages, previous e-mail messages and/or previous product-ordering history (e.g., over the Internet or by using the player's cell phone as an electronic wallet).

In any given contest, or in some cases across all or multiple contests, server 12 preferably calculates one or more performance indicia for each of the various players. Such performance indicia can include, e.g.: percentage of total problems answered correctly, percentage of total problems in each of multiple different categories answered correctly, an overall performance score and/or a performance score by category. Each such performance score can be based on any of a variety of different factors, including, e.g.: a simple percentage of problems answered correctly, a weighted average of problems answered correctly (e.g., with different weights being assigned to different problems based on assumed or measured difficulty, such as where difficulty is measured based on the percentage of respondents who answered correctly), the number of problems attempted by the player, the amount of time in which responses were submitted for particular problems, the extent to which correct responses are diverse across many categories or are limited to just one or two categories, and/or when a particular problem was answered (e.g., with more recent problems being weighted more heavily than problems answered a long time ago).

For example, players attempting more problems preferably are given a higher score, all other things being equal, at least within specified ranges (e.g., after some threshold, differences in numbers of questions answered probably will not be as significant). In addition, in order to minimize a player only attempting questions in one subject (and therefore giving unfair preference to that subject), the performance score preferably is calculated according to a formula that accounts for how many opportunities a player has with one subject versus other subjects. In any event, such percentage(s) or score(s) preferably are updated on a regular basis and provided to the players through one or more user interfaces (e.g., such as interface 300, 310 or 380).

One or more of such performance indicia preferably also are used by server 12 for ranking the players in each contest. Once again, such rank(s) preferably are updated on a regular basis and provided to the players through one or more of the contest user interfaces.

In any or all of the contests described herein, players can (e.g., depending upon the embodiment and/or the choice of the individual player): (1) compete on an individual basis, compete using the "powering" technique described in the '179 Application (i.e., by becoming part of a powering ring, sometimes referred to herein as a "power-ring"); (2) compete as part of a team (sometimes referred to herein as a "team-ring") in which the rings compete against each other and the members earn Dallions based on their ring's performance; or (3) compete as part of a "hybrid-ring" in which the members earn Dallions in part based on the ring's performance and in part based on their own individual performance.

The way(s) in which rings are formed can vary across different embodiments. In one, a player simply decides to start and manage a ring (i.e., thereby becoming a RingMaster) and then goes about selecting players to join his or her ring, or attempting to entice players to join the ring (such players sometimes being referred to herein as RingMates or simply Mates). In that regard, the RingMaster preferably can, e.g., search through the universe of contest players, e.g., using any of the techniques and/or search criteria discussed above.

However, in certain embodiments a player must first become qualified in order to become a RingMaster, e.g., by reaching a specified performance level. For instance, a contest might be structured such that each RingMaster must have: won a previous contest, ranked above a certain threshold in a contest, earned a specified minimum number of Dallions based on his or her own responses, and/or any combination of the foregoing or any other criteria. Once qualified in accordance with the applicable criteria, the RingMaster can then begin to construct a ring, e.g. as described above.

In certain embodiments (e.g., the team-ring embodiments), the rings receive questions as a group and thus have the chance to earn (and lose) Dallions as a group (e.g., based on average accuracy percentage across the ring). In certain embodiments, the RingMaster can decide how long the Ring will last before being disbanded (e.g., 2 days or 1 week) and/or what the accuracy percentage should be (ex. 80%, 10%). Of course, if the percentage is very low, then the return in winnings would be low as well. In addition, the RingMaster preferably has administrative rights with respect to the ring (e.g., creating a ringtone that all RingMates hear when a new problem is announced and/or naming the ring). However, in some embodiments the rings are named to systematically (e.g., according to the Greek alphabet: Alpha, Beta, Gamma, Delta, etc.)

In some cases, contests are open to all individual players and/or rings. In others, contests are only open to individuals (in some cases allowing powering) or are only open to rings (or only to rings having a specified size or other specified characteristics). In certain embodiments, the contest administrators sometimes announce new contests (e.g., on a pseudorandom basis) where participation is limited based on characteristics pertaining to one or more existing contests and/or pertaining to the overall game (e.g., only the top 10 rings, or the highest-scoring individual in each ring, in a particular contest are allowed to compete).

Also, in certain embodiments, the members of a ring periodically (or on a pseudorandom basis) compete against each other. For example, members might be required to contribute an entrance fee of 10 Dallions. Then, at an unexpected time, a problem is delivered and the total entrance fees are distributed among the members of the ring who answer correctly within a specified time period.

In certain embodiments, at least some of the players (e.g., those who are not currently performing well but are ranked 25 or higher) receive a problem (e.g., on a pseudorandom basis) which, if answered correctly, will significantly increase their score and/or rank. Such problems may be delivered as a bonus or, alternatively, players may have an option to wager some number of their existing Dallions on their ability to answer correctly.

More generally, 'bidder' questions may be made available periodically or on a pseudorandom basis, giving all of the players the opportunity to bid a number of Dallions before they answer (e.g., double or nothing). In certain embodiments, this feature is only made available to players that have achieved some milestone (such as reaching a specified number of Dallions or having answered a specified number of problems).

In addition, or instead, players may be required to pay Dallions for the ability to compete in particular contests (e.g., as an entrance fee). In some cases, particularly where the contest has been organized by one or more players rather than the contest administrators, such entrance fees are aggregated and distributed as the prizes in the contest.

As indicated above, different problems might have different levels of difficulty, with easier problems rewarding correct responses with fewer Dallions than medium or difficult ones. This difficulty level may be communicated to the players in advance, giving the players a chance to opt out of responding to the problem. Alternatively, for a particular problem presentation, the individual player may have the option to choose the level of difficulty, i.e., so that different problems with different levels of difficulty (and correspondingly different potential rewards) are available at a single presentation.

In certain embodiments, the players are assigned to levels based on their accomplishments, e.g., in a single contest, in a single problem category or across the entire contest or game environment. The requirements for reaching each level may be quantitatively and/or qualitatively different for different levels. For example, going from the initial Level 1 to Level 2 goal might require a player to correctly answer 3 questions in a row. Achieving Level 3 might then require satisfaction of some criteria pertaining to the player's sponsor(s). Achieving Level 4 might then require the player to have 10 Mates (or buddies). Alternatively, rather than using qualitatively different criteria for the different levels of a single classification system, different classification systems may be used for different purposes, each having its own multi-level structure. For example, there might be one or more multi-level classifications for problem-solving competence, a different multi-level classification for social achievement within the contest environment and/or a different multi-level classification established by each of these sponsors. In any event, in certain embodiments the different levels of at least one of the classification schemes are represented visually as a set of concentric rings, and as the player reaches the higher levels, an indicator moves closer toward the center of the displayed ring. For example, the center or the "O-Zone" may be designated as special player status.

As noted above, any or all of such classifications may be used as the basis for assigning an identifier to a player (e.g., by concatenating short standardized references to the categories or classifications). In addition to simply displaying such identifiers as part of the player's profile, in some embodiments notifications are sent to the players, particularly where the player has made some unique achievement (e.g., "Congratulations! You're the first to become a _____ head!").

In certain embodiments, problems are divided into main categories, and those main categories are further subdivided into subcategories. When a player excels in multiple subcategories of the same main categories, he or she preferably is given an identifier indicating the main category, such as "RennaisanceHead" or "RightBrainHead".

In certain embodiments, the players have access to a list of all previous problems and their correct answers. In other embodiments, only certain previous problems and their answers are available to the players (e.g., the last 10 or some other number of the most recent problems). In either case, the players preferably have the ability to save their favorite problems for later reference, e.g., by selecting a 'heart' icon; upon doing so, the designated problem and its correct response can be stored, e.g., either: locally on the player device 21, into dedicated storage space for the player on the server 12, or in the general database on server 12, with a link to the problem/response either on player device 21 or in dedicated storage space for the player on server 12.

As with the contest described in the '179 Application, the number of Dallions awarded for answering a problem correctly preferably declines the time, and no Dallions are awarded for any response submitted after a maximum specified time period. In addition, the players may be assessed a penalty (e.g., a loss of Dallions) for any or all of: passing on a problem (i.e., indicating that the player does not wish to submit a response), letting time expire on a problem, and/or answering a problem incorrectly. For example, there might be a small penalty for passing on the problem, a larger penalty for letting the maximum time period expire, and an even larger penalty for answering incorrectly. In the case of the expired-time penalty, an opt-out or opt-in screen preferably is displayed prior to presenting the problem (unless the expired-time penalty is the same as the penalty for passing on a problem).

Preferably, after a problem has been delivered, the players are given indications as to how much time is left to respond. Such indications may be in the form of a digital countdown clock, an analog clock where the time is up when an indicator hand (e.g., configured as the contest's logo) makes a full rotation, as a bar that changes color from left to right or bottom to top, or anything similar. Also, rather than indicating the amount of time remaining, the indication may be the amount of Dallions that will be won (e.g., declining over time) if the player submits a correct response at that point. In certain embodiments, after each problem the players are able to see who was the fastest to answer it correctly, e.g., with an ordered list of the fastest players and their times.

In certain embodiments, players also have an opportunity, e.g., from time to time, to win additional Dallions (either within a contest or outside the context of any particular contest) without the necessity of solving or answering the kinds of problems that typically are presented. For example, Dallions may be distributed randomly, such as by distributing a fixed number of Dallions to each of 5 randomly chosen players. In another example, the players are notified at an unexpected time, and the first 3 players to click a "reply" button win additional Dallions. In a third example, players provide a response but the correct response appears to be random, such as where players are invited to guess a number within a specified range and the player guessing closest to the true number wins additional Dallions.

The problems delivered to the players can be trivia questions (e.g., multiple choice or fill-in-the-blank) and/or various kinds of puzzles. In addition, rather than displaying the problem all at once, it instead could be revealed over time. In one example, blocks of an image are gradually revealed until the player guesses what the full image is (e.g., with faster times resulting in larger awards of Dallions). In another example, clues are given out over an extended period of time, such as by providing clues to a weekly riddle throughout the week, leading up to the final clue or the actual question.

Still further, in certain embodiments the answers to a set of questions can be combined to reveal a bonus question. For example, the answers of 3 separate questions might be: 'actor', 'joey', and 'friends' so that the answer clues are implying the question, "Who is the actor who plays Joey on the show "Friends?" A player therefore would need to type "Matt LeBlanc" into the blank space to correctly answer the bonus question. Where such bonus questions are used, the answers to the initial questions preferably are not provided until the time period for responding to the bonus question has expired. Also, in such situations, the initial questions in the bonus question preferably are delivered simultaneously or in fairly quick succession.

In one contest (or portion of a contest), the player's progress is visually displayed through a series of concentric rings. Correctly answering a first problem lights up the outer ring, correctly answering the second problem lights up the first inner ring, and if the player correctly answers the third problem in a row then the most inner ring lights up, e.g., placing the player's symbol in the Center Dot/Ring, which earns the player bonus Dallions (e.g., triple the accumulated Dallions) plus a chance to earn a bonus prize if the fourth and final problem is answered both correctly in the shortest amount of time among all then-remaining players. Alternatively, any other engaging visuals may be used in order to incentivize players to want to answer multiple problems in a row. In certain embodiments, an individual player who correctly answers a question also can earn bonus points by forwarding a question to a friend he or she thinks cannot answer it.

The contest system of the present invention preferably also permits an individual player to challenge one or more other players to a kind of duel or small-group competition (sometimes referred to herein as a rangle). The basis of the competition can be questions or other problems provided by the contest server 12, or any other kind of problem or task. Preferably, the initiator of the rangle can either have the server 12 seek for an opponent (e.g., by broadcasting a general request) or can send a direct message to one or more individuals (e.g., existing friends) presenting the challenge.

Different rangle formats are possible. For example, the winner of the rangle might be the first player to achieve a certain point total or the player having the highest point total at the end of a fixed-duration competition (such as a pre-set number of questions). Another example is the carnival-style rangle, in which icons representing the players move along a track, advancing for each problem answered correctly (e.g., with the distance being based on difficulty of the problem and/or speed in answering it correctly) and potentially moving backward for each problem answered incorrectly, and the first icon to reach the finish line is the winner.

Such an ability to create a mini-contest on a more or less ad hoc basis preferably also includes the ability to create other multi-player contests: for example, a "host" player can gather other players into a game by searching for them in the network or identifying them in any other manner. Once everyone is logged into the game, the host can then choose specific questions or categories of questions that will be sent out to the players. When implemented across cellular-based telephones or other wireless devices, such multi-player contests can be flexibly created in a variety of different settings, e.g., in an office setting, at a party or other social gathering, in a restaurant or bar, at a sporting event (e.g., pinging all players at a sporting event with the same question during timeouts, half time, or other breaks in play), at a tailgate party, during a guided tour, during a school field trip, or at a meeting, rally or convention. In some of such mini-contests, players have to buy-in or ante up with points, and the winner or winners divvy up the pot.

The actual format of such a multi-player contest has many variations. For example, the wireless device can function as a buzzer, so only the first person to buzz in can answer the question. Players can be organized into teams that take turns answering questions. The contest can be structured as one or more team rangles in which one team chooses the category of question that the other team must answer (e.g., motivating the players to choose their teammates based on their expertise in a specific subject). In addition, such a question/answer format and can be incorporated into the playing of an existing board game, e.g., where moves, actions, money/point earnings and/ or money/point losses are dependent upon whether or not a particular problem is answered correctly and/or timely.

As should be readily apparent from the preceding discussion, multi-player contests often will be conducted in an environment in which all players are physically present. In order to increase the number of players participating, once the host has set up the contest, the individual players preferably are able to easily sign up, such as by text-messaging a contest code to the server 12, by opening the contest application on his or her wireless device and submitting the contest code through that interface, or by navigating to a webpage that has been set up for the contest. Also, a variety of such different sign-in techniques preferably are made available simultaneously so as to be able to accommodate as many potential players as possible, both players that are already registered to the contest system and players who have not yet registered, as well as to accommodate as many different wireless devices as possible. For similar reasons, a variety of different ways to participate preferably are provided, e.g., through a player application on the player's wireless device (e.g., for registered players) or through a website or text messaging (e.g., for non-registered players).

As indicated above, such multi-player contests can be used for scavenger/treasure hunt prompts. In addition, they can be used for clue-based races, e.g., where arriving at a location will prompt delivery of a clue to the next location. If a team-based hunt, players might be encouraged to use their wireless devices to call or otherwise message a teammate who is closer to a specific location. In addition (or instead), in certain embodiments such teams have the ability to create a closed chat room within the contest site in order to facilitate collaboration with each other.

Contest Environment

In the preferred embodiments, server 12 hosts a contest environment that includes a variety of different features beyond simple contest management. One of such features (discussed in significant detail above) is the provision of player-access and related social networking functionality, e.g., through the Ringodex.

Another is the ability for sponsors and players, as well as the contest site itself, to create groups and/or virtual spaces within the contest site in which the members of such groups can interact. In one example, the members of the group communicate with each other by directing messages to the entire group through the Ringodex. In another, the members can interact with each other by going to a specific virtual space within the contest site, where they can, e.g., chat, exchange files and/or engage in ad hoc challenges (e.g., rangles) in which Dallions can be wagered in certain embodiments.

One example of such a site is a promotional site where the players can share some aspect of their thoughts or beliefs separate from the contest (e.g., what they are questioning most, such as "I question the government." "I question global warming." "I question my friend's loyalty.").

Another feature of the preferred embodiments is the provision of a two-dimensional or three-dimensional virtual environment in which players can interact using avatars representing them (e.g., as described in U.S. Provisional Patent Application Ser. No. 61/103,205, filed on Oct. 6, 2008, and the subsequent nonprovisional U.S. patent application Ser. No. 12/573,747, filed Oct. 5, 2009, which applications are incorporated by reference herein as though set forth herein in full). Preferably, problems can be delivered through such a virtual environment, Dallions can be used to acquire items within such a virtual environment and/or players can interact with each other in a variety of different ways within such a virtual environment.

For example, in addition to the straightforward approach of presenting a question, the problems delivered in the virtual environment can give a nature is such that the avatar must interact with the virtual environment to reveal and/or solve the problem. In one specific example, the problem is in the nature of a video game, e.g., requiring the avatars to navigate through an obstacle course as quickly as possible, to defeat or inflict as much damage as possible on a computer-generated opponent or another player's avatar and/or to score points in any other conceivable manner. Any one of such problems: (1) can be presented only on an occasional basis within the virtual environment or (2) can be a permanent part of the virtual environment that a player can go to at any time in an attempt to earn additional Dallions or to challenge another player, potentially wagering Dallions on the outcome.

In certain embodiments, the contest site is accessible (or at least viewable) through a portal or window in the virtual environment (e.g., accessed via a dorm room computer or a panel on the wall of the avatar's home space). For example, a poster on the wall might show the player's label and top category scores. Alternatively, aspects of the overall contest might be visualized and/or accessible using any of a number of different virtual accessories (e.g., cell phone, sunglasses, helmet, etc.) or avatar effects (e.g., halos, green glow, question mark above the avatar's head, avatar leaves contest-branded footprints).

Similarly, certain embodiments of the virtual environment provide a doorway/portal to an alternate dimension devoted to the overall contest or some portion of it, e.g., where players can gather. Such an alternate dimension can be configured as a contest room or suite within the larger virtual environment (e.g., which in turn might be configured as a dorm complex) or as a separate building within the larger virtual environment (e.g., a but in a virtual environment configured as an island). Alternatively, or in addition, some virtual article or device (e.g., a helmet) might transport the player to a contest gameplay arena when the avatar puts it on. Any such contest areas can be a space for rangle challenges or include a subspace for such challenges (such as a separate room with the contest suite or building).

Scavenger hunt, treasure hunt and/or other location-based problems, similar to those described above in connection with the real world, also may be delivered within a virtual environment, e.g., in which a problem is delivered based on proximity of the player's avatar to a particular feature within the virtual environment. In certain embodiments, questions or other kinds of problems are hidden inside locations and objects that are seemingly randomly dispersed throughout the virtual environment. For example, a problem might only appear at certain viewing angles or appear on a hillside, cliff face, in the water, in the clouds, at the end of a rope that must be pulled out, or behind a poster hanging on the wall. Then, a player triggers delivery of the problem when the player's avatar sees some indicia of it, interacts with it or walk across it.

In addition, because the server 12 typically will have complete information regarding the activities of the player's avatar in the virtual environment, any activity, location, circumstance or interaction, as well as any combination of the foregoing, can be specified as a trigger event for delivery of a particular problem.

In short, the ways in which problems can be delivered in the virtual environment often will be much more flexible than is possible in the real world. For example, in certain embodiments players can acquire and customize "passive rangle" problems (e.g., to place in their home space or elsewhere in the virtual environment) as a challenge to those who come upon them. In the preferred embodiments, such players can set the topic or even choose the specific questions, and then set a Dallion value on the problem. Other players who accept the rangle preferably will win Dallions from the player who set it up (if the response is correct and timely), or will lose their own Dallions to him or her. Preferably, each such passive rangle can only be played a specified number of times.

Still further, in certain embodiments involving a virtual environment implementation, in order to gain access to a particular part of the virtual environment (e.g., access to a building, crossing a bridge, etc.) the player must correctly answer/solve a question or other problems delivered to the avatar.

In addition to the other contests and related features described herein, a variety of special events and programs are contemplated in the various embodiments of the present invention. One such event is the designation of a time period (e.g., a particular month) where all Dallions earned are matched by the contest's administrators and donated to charity (e.g., the particular charitable sponsor that the player has designated or a default charity if none has been designated). A second such event is a contest or tournament (e.g., conducted annually) in which the winner (e.g., the player earning the most Dallions) wins a year's free college tuition. In accordance with one such program, the players are permitted to donate their Dallions to charities (e.g., a single charity for all players, different charities designated by the different players or the players' charitable sponsors, if any). Another such program allows players to give their Dallions to other players.

As noted above, the present invention contemplates multiple different contests. Each typically will have its own visual appearance, or "skin". In certain embodiments, the players are encouraged to develop skins for future contests (e.g., the user interface presented by the player application delivering the problem), such as by conducting a competition, selecting the best skin and, in some or all cases, rewarding the winning designer (e.g., with additional Dallions).

In certain embodiments of the invention, a Player of the Month is chosen from all bios submitted by the players. The contest administrators then highlight the selected Player of the Month.

An additional feature of certain embodiments of the invention is an add-on (e.g., in the player's option) to the alert-based client discussed in the '179 Application or the present player application 160 that turns on the webcam or other camera on the player's device 21 when receiving a problem. The add-on then records the player's reaction to the problem and offers to upload the resulting clip to the contest site.

Several tools preferably are provided for use by the contest administrators (e.g., through server 12). One such tool inputs problems created by the contest's administrators and provides an interface for tagging such problems with player-designated categories, either individually (e.g., by dragging the problem to the appropriate category/subcategory icon) or in groups (e.g., by highlighting or otherwise selecting multiple problems and then clicking the appropriate category icon). Another such tool (or the same tool) accepts new contest problems (e.g., trivia questions), maintains a database of problems previously presented to the players, accepts corrections (e.g., if an incorrect answer was previously marked as correct or if there are in fact two correct answers), and adjusts Dallions for players affected by any such error.

As indicated above, problems can be delivered to the players in a variety of different ways. One way is to deliver the problems substantially simultaneously (e.g., as discussed in the '179 Application). Various approaches to such substantially simultaneous delivery are possible, such as any of the following (some of which overlapping techniques discussed in the '179 Application).

According to one substantially simultaneous delivery approach, the client application (discussed in the '179 Application) running on the player device 21 makes a request to the server 12 (e.g., after the client application has woken up), indicating that it needs to deliver a problem, e.g., in 20 seconds. The server 12 then sends clock synchronization data (together with the problem, if not previously delivered), making an assumption as to what the latency time will be to deliver information to and from server (e.g., assuming that inbound and outbound latency times are the same). Upon receiving this clock synchronization information, the client application adjusts its clock time and delivers the problem at the appropriate moment.

According to another substantially simultaneous delivery approach, server 12 initiates a connection with the various client applications (discussed in the '179 Application) in groups, e.g., with 5,000 client applications at a time (e.g., for load balancing purposes). Then, for the current group, server 12 delivers the next alert or sequence of alerts and synchronizes the local clocks with the server clock.

According to a still further substantially simultaneous delivery approach, the server 12 repeatedly (e.g., at random times) connects with each client application (discussed in the '179 Application) to check synchronization of alerts with the server clock. That is, the server 12 performs re-synching with the individual client applications according to its own schedule.

According to yet another substantially simultaneous delivery approach, the server 12 contacts each of the client applications (discussed in the '179 Application), and/or each of such client applications (having previously been synchronized to the server clock) contacts the server 12, a short period of time (e.g., 20 seconds) before a problem is to be delivered. In either case, each such client application is logged in as a broadcast or multicast client to server 12. That is, each such client application prepares to receive and then immediately (or almost immediately, e.g., with only a relatively small amount of buffering to achieve more closely simultaneous delivery) display the message containing the problem from server 12, so that the only significant latency differential is attributable to the Internet (or other network) path. Then, at or very close to the scheduled delivery time, the server 12 broadcasts or multicasts the message containing the problem to all of the client applications. In order to further decrease network latency time, server 12 preferably employs a technique (e.g., an existing technique) for parallel routing (e.g., such as is commonly used in voice-over-IP telephone calls). This use of a broadcast or multicast IP protocol in combination with forced parallel routing typically will provide significant efficiencies, permitting substantially simultaneous delivery to a large number of players, while using relatively little Internet (or other network) bandwidth. In addition, or instead, broadcast transmission over other communication channels (e.g., AM or FM radio, satellite radio, cable or other broadcast channels) may be employed, allowing those player devices 21 having access to such channels to receive the problem transmission in that manner, if desired (e.g., after preparing in advance to receive the message in that manner, as discussed above).

Specific Hardware and Related Considerations

Generally speaking, except where clearly indicated otherwise, all of the systems, methods, functionality and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive or a solid-state drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, workstations, personal computers and/or even smaller computers, such as PDAs, wireless telephones or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server device, computer-readable medium or other storage device, client device, or any other kind of device, such references should be understood as encompassing the use of plural such processors, computers, server devices, computer-readable media or other storage devices, client devices, or any other devices, except to the extent clearly indicated otherwise. For instance, a server generally can be implemented using a single device or a cluster of server devices (either local or geographically dispersed), e.g., with appropriate load balancing.

Additional Considerations

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a player in any other manner using the same or any other user-interface mechanism. In addition, or instead, such commands or information may be input by an automated (e.g., computer-executed) process. Also, the term "page", as used herein, each generally refers to a particular set of content or user interface controls that may populate a given window within an overall user interface.

Several different embodiments of the present invention are described above and in the applications incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A system for conducting a contest, comprising:
a computer-readable storage medium storing computer-executable process steps; and
a processor coupled to the storage medium, retrieving and executing said process steps, wherein said process steps comprise:
(a) providing a contest that is played by a plurality of players across a communications network, in which the players compete to earn points awarded by a central contest administrator and the individual players are ranked based on their total number of points; and
(b) allowing individual ones of the players to select a sponsor from a set of previously identified sponsors,
wherein the players also can earn points, which contribute to their totals for ranking purposes, from the sponsors they have selected, and
wherein individual ones of the sponsors in the set are allocated points and have individual discretion regarding how to award their allocated points to the players that have selected them.

2. A system according to claim 1, wherein individual ones of the players are allowed to select, and therefore earn points from, a plurality of sponsors from the set.

3. A system according to claim 2, wherein each of the players is limited to selecting a pre-specified maximum number of sponsors from the set.

4. A system according to claim 2, wherein when a particular player selects fewer sponsors said particular player is provided with an ability to receive additional points from the sponsors selected by said particular player.

5. A system according to claim 2, wherein each of the players can designate one of its selected sponsors as its principal sponsor.

6. A system according to claim 5, wherein when a particular player designates a principal sponsor said particular player is provided with an ability to earn additional points from the designated principal sponsor.

7. A system according to claim 1, wherein a plurality of the sponsors conduct side contests to award their allocated points to the players that have selected them.

8. A system according to claim 1, wherein a plurality of the sponsors provide resources to assist the players in playing the contest.

9. A system according to claim 1, wherein success in the contest primarily requires providing correct answers to questions delivered by the contest administrator.

10. A system according to claim 1, wherein a virtual community is established for each of a plurality of the sponsors and interactions within the virtual community are limited to those players who have selected the corresponding sponsor.

11. A system according to claim 1, wherein the sponsors are allocated different numbers of points to distribute based on the numbers of players who have selected them.

12. A system according to claim 1, wherein symbols of individual sponsors: (1) appear on a contest user interface of the individual players who have selected them and (2) also appear on profiles for the individual players who have selected them when said profiles are viewed by other players.

13. A system according to claim 1, wherein the sponsors are provided special access to communicate with the players who have selected them.

14. A system according to claim 1, wherein only players who have selected a particular sponsor are eligible to receive the points allocated to said particular sponsor.

* * * * *